United States Patent
Oba et al.

(10) Patent No.: US 10,673,624 B2
(45) Date of Patent: *Jun. 2, 2020

(54) COMMUNICATION CONTROL DEVICE, COMMUNICATION CONTROL METHOD, AND COMPUTER PROGRAM PRODUCT

(71) Applicant: Kabushiki Kaisha Toshiba, Minato-ku (JP)

(72) Inventors: Yoshihiro Oba, Kawasaki (JP); Yoshikazu Hanatani, Komae (JP)

(73) Assignee: Kabushiki Kaisha Toshiba, Minato-ku (JP)

(*) Notice: Subject to any disclaimer, the term of this patent is extended or adjusted under 35 U.S.C. 154(b) by 236 days.

This patent is subject to a terminal disclaimer.

(21) Appl. No.: 15/443,345

(22) Filed: Feb. 27, 2017

(65) Prior Publication Data

US 2017/0170958 A1 Jun. 15, 2017

Related U.S. Application Data

(63) Continuation of application No. PCT/JP2014/079138, filed on Oct. 31, 2014.

(51) Int. Cl.
*H04L 9/08* (2006.01)
*H04L 9/06* (2006.01)
(Continued)

(52) U.S. Cl.
CPC .......... *H04L 9/0836* (2013.01); *H04L 9/0618* (2013.01); *H04L 9/0822* (2013.01);
(Continued)

(58) Field of Classification Search
CPC ... H04L 9/0836; H04L 9/0618; H04L 9/0822; H04L 9/00; H04L 12/185; H04L 43/04;
(Continued)

(56) References Cited

U.S. PATENT DOCUMENTS 6,421,662 B1 * 7/2002 Karten ................ G06F 16/2237
7,043,024 B1 * 5/2006 Dinsmore ............ H04L 9/0836
380/278
(Continued)

FOREIGN PATENT DOCUMENTS

JP 200564219 A * 3/2005 ............... H04L 9/08
JP 2005-123678 5/2005
(Continued)

OTHER PUBLICATIONS

Author(s):(Manos Athanassoulis and Anastasia Ailamaki) Title: BFTree: Approximate Tree Indexing Date: Sep. 1-5, 2014 vol. 7, No. 14, pp. 12 (Year: 2014).*

(Continued)

*Primary Examiner* — Jeffrey C Pwu
*Assistant Examiner* — Ali H. Cheema
(74) *Attorney, Agent, or Firm* — Oblon, McClelland, Maier & Neustadt, L.L.P.

(57) ABSTRACT

A communication control device includes a receiving unit, a generating unit, and an output unit. The receiving unit receives input of a binary tree in which each leaf node has an index and a node key assigned thereto, and receives input of node IDs that, from among the leaf nodes, enable identification of the leaf nodes belonging to a group. The generating unit generates, using the node key assigned to the root node of each partial tree of the binary tree which includes only the leaf nodes identified by the node IDs, a cipher text by encrypting a group key shared in the group, and generates set information containing the generated cipher text. The output unit outputs the set information at least to the communication devices that are associated to the leaf nodes belonging to the group.

18 Claims, 20 Drawing Sheets

(51) Int. Cl.
  *G06F 16/22* (2019.01)
  *G06F 16/00* (2019.01)
  *H04L 12/18* (2006.01)
  *H04L 12/26* (2006.01)
  *G06F 16/2453* (2019.01)

(52) U.S. Cl.
  CPC ...... *G06F 16/2237* (2019.01); *G06F 16/2246* (2019.01); *G06F 16/2453* (2019.01); *H04L 12/185* (2013.01); *H04L 43/04* (2013.01)

(58) Field of Classification Search
  CPC ... H04L 9/08; H04L 9/06; H04L 45/16; H04L 63/062; G06F 16/2237; G06F 16/00; G06F 16/2246; G06F 16/9027; G06F 16/2453; G06F 16/24561; G06F 11/1092; G06F 21/10; G06F 8/427; G06T 17/005
  USPC .... 380/45, 277, 278, 279, 270, 44; 370/256, 370/390; 707/610, 737; 709/224; 713/165; 711/207
  See application file for complete search history.

(56) References Cited

U.S. PATENT DOCUMENTS

| | | | |
|---|---|---|---|
| 10,176,627 B2* | 1/2019 | Pearson | G06T 17/005 |
| 2001/0042240 A1* | 11/2001 | Ng | G06F 8/427 |
| | | | 717/122 |
| 2003/0142826 A1* | 7/2003 | Asano | H04L 9/0836 |
| | | | 380/277 |
| 2003/0161474 A1* | 8/2003 | Matsuzaki | H04L 9/0836 |
| | | | 380/277 |
| 2005/0210014 A1* | 9/2005 | Asano | G06F 21/10 |
| 2006/0059179 A1* | 3/2006 | Asano | H04L 9/0836 |
| 2007/0140480 A1 | 6/2007 | Yao | |
| 2007/0189539 A1* | 8/2007 | Kim | H04L 9/0822 |
| | | | 380/277 |
| 2008/0071769 A1* | 3/2008 | Jagannathan | G06F 16/2453 |
| 2008/0152133 A1* | 6/2008 | Suga | H04L 9/0836 |
| | | | 380/45 |
| 2009/0106194 A1* | 4/2009 | Furusho | G06F 16/9027 |
| 2009/0232031 A1* | 9/2009 | Vasseur | H04L 12/185 |
| | | | 370/256 |
| 2010/0077201 A1 | 3/2010 | Asano et al. | |
| 2011/0145578 A1 | 6/2011 | Asano et al. | |
| 2011/0158405 A1* | 6/2011 | Choi | H04L 9/0836 |
| | | | 380/44 |
| 2012/0243685 A1* | 9/2012 | Tanaka | H04L 63/062 |
| | | | 380/270 |
| 2013/0010790 A1* | 1/2013 | Shao | H04L 45/16 |
| | | | 370/390 |
| 2013/0013890 A1* | 1/2013 | Manner | G06F 16/24561 |
| | | | 711/207 |
| 2013/0046974 A1* | 2/2013 | Kamara | H04L 9/00 |
| | | | 713/165 |
| 2014/0359348 A1* | 12/2014 | Volvovski | G06F 11/1092 |
| | | | 714/6.22 |
| 2015/0178375 A1* | 6/2015 | Ishizaki | G06F 16/2246 |
| | | | 707/737 |
| 2015/0188785 A1* | 7/2015 | Hanatani | H04L 43/04 |
| | | | 709/224 |
| 2015/0324410 A1* | 11/2015 | Glover | G06F 16/00 |
| | | | 707/610 |
| 2016/0301572 A1 | 10/2016 | Oba et al. | |

FOREIGN PATENT DOCUMENTS

| | | | | |
|---|---|---|---|---|
| JP | 2005-268926 | | 9/2005 | |
| JP | 2007-174083 | | 7/2007 | |
| JP | 2008-131076 | | 6/2008 | |
| JP | 200936022 A | * | 2/2009 | ............... H04L 9/08 |
| JP | 2011-130012 | | 6/2011 | |
| JP | 2014-93666 | | 5/2014 | |
| WO | WO 2015/097834 A1 | | 7/2015 | |

OTHER PUBLICATIONS

Title: BF-Tree: Approximate Tree Indexing—Author: Manos Athanasoulis Date: Sep. 1-5, 2014 vol. 7, No. 14, pp. 12 (Year: 2014).*
International Search Report dated Nov. 25, 2014 in PCT/JP2014/079138, filed on Oct. 31, 2014 (with English Translation).
Written Opinion dated Nov. 25, 2014 in PCT/JP2014/079138, filed on Oct. 31, 2014.
Dalit Naor et al. "Revocation and Tracing Schemes for Stateless Receivers," Cryptology ePrint Archive , 2001, pp. 35.
"P802.21™/D05 Draft Standard for Local and metropolitan area networks—Part 21: Media Independent Services Framework," IEEE 802.21d/D05, Sep. 2016, pp. 329.
M. Baugher et al., "The Group Domain of Interpretation", Network Working Group, http://www.ietf.org/rfc/rfc3547.txt, Jul. 2003, pp. 37.
Written Opinion dated Mar. 25, 2014 in PCT/JP2013/085009 filed on Dec. 26, 2013.
International Search Report and Written Opinion dated Mar. 25, 2014 in PCT/JP2013/085009 filed on Dec. 26, 2013 (w/English translation).
Japanese Office Action dated Jun. 14, 2016 in Patent Application No. 2015-554420 (w/English translation).

* cited by examiner

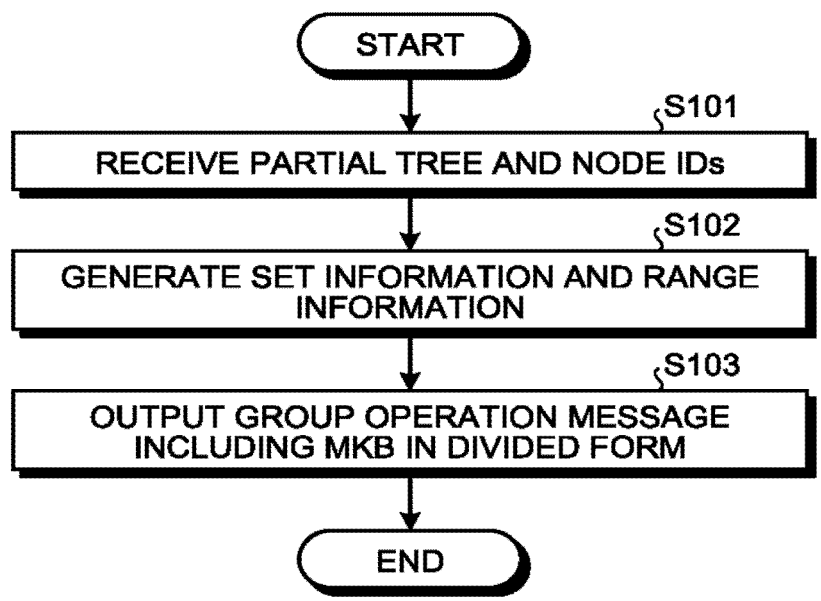
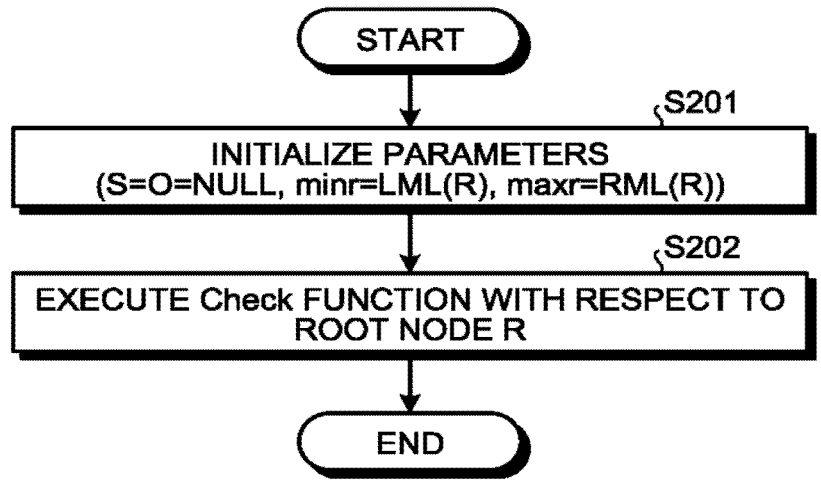

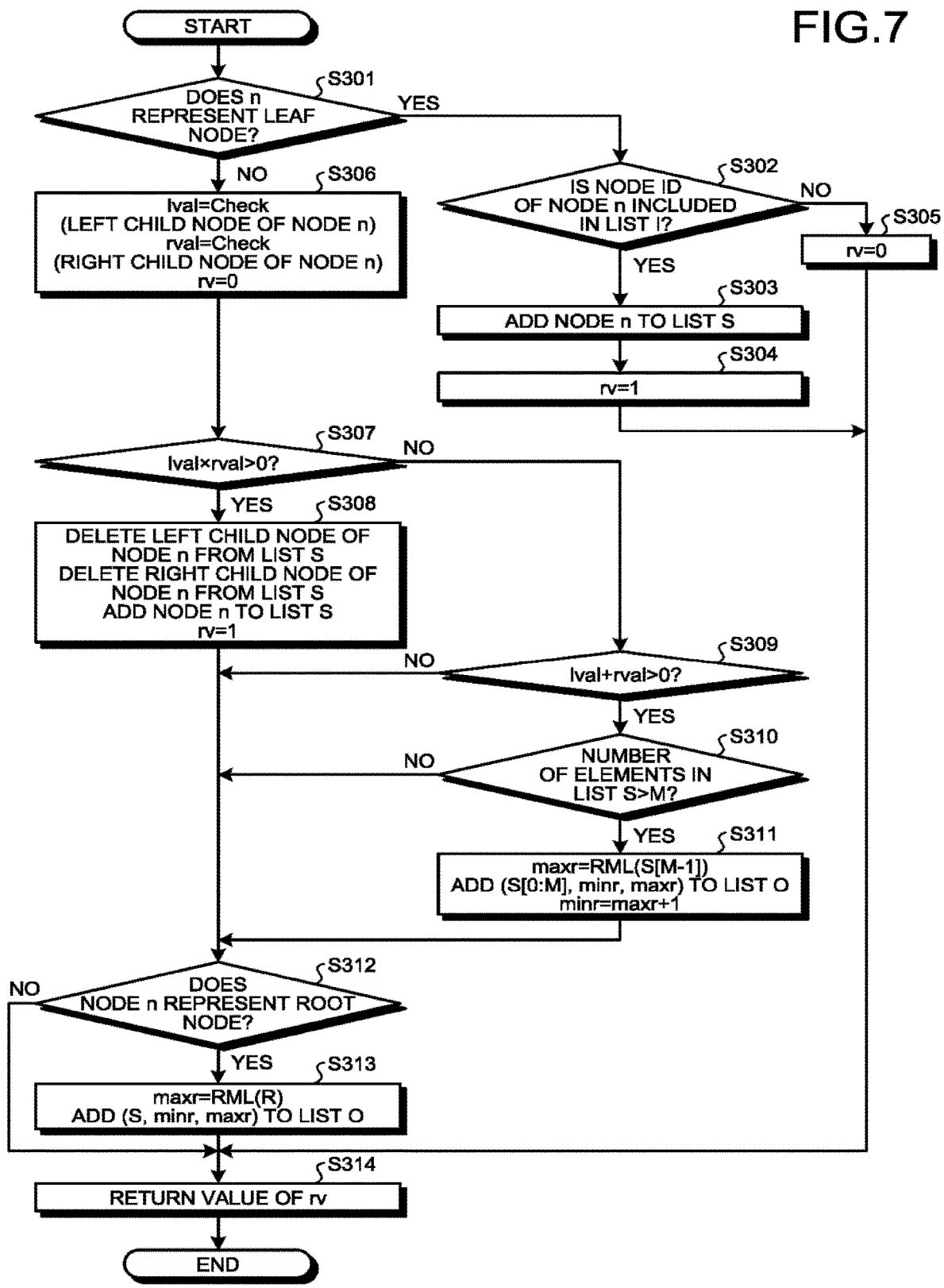

FIG. 9

```
def CreateCompleteSubtreeFragments(I, T, R, M):
        # Input I: List of indices of leaf nodes to be included in the group
        # Input T: The entire tree that covers all leaf nodes
        # Input R: Root node of the entire tree
        # Input M: Maximum number of subtrees in per fragment
        # Output O : List of (S, minr, maxr):
        #   S: Subtrees covering the group.
        #   minr: Lower bound of Subgroup Range
        #   maxr: Upper bound of Subgroup Range
        O=[]
        S=[]
        depth=int(math.log(len(T)+1,2)-1)

def rightmost_leaf_number(n):
                # Input n: subtree root node
                # Output y: rightmost leaf number under the subtree
                h=n.index.len  # hierarchy level of node n
                x=int(n.index.val, 2)  # node index in decimal
                y=(x+1)*(2**(depth-h))-1
                return y def check(n):
                # Input n: subtree root node
                # Output 0, 1
                #  0 : Some node in the subtree is a non-member of the group.
                #  1 : All nodes in the subtree are members of the group.
                global minr
                rv=0
                if n.left==None and n.right==None:  # n is leaf
                        if n.index.val in I:
                                S.append(n)
                                return 1
                        return 0
                # n is non-leaf
                lval=check(n.left)
                rval=check(n.right)
                if lval*rval>0:
                        S.remove(n.left)
                        S.remove(n.right)
                        S.append(n)
                        rv=1
                elif lval+rval>0:
                        if len(S) > M:  # one fragment is ready
                                maxr=rightmost_leaf_number(S[M-1])
                                O.append((S[0:M], minr, maxr))
                                S[0:M]=[]  # Remove the appended subtrees
                                minr=maxr+1
                        rv=0
                if n==R:  # Root node. len(S)>0
                        maxr=2**depth-1
                        O.append((S, minr, maxr))
                return rv
        check(R)
        return O
```

FIG.15

```
def CreateCompleteSubtreeFragments(I, T, R, M):
    # Input I: List of indices of leaf nodes to be included in the group
    # Input T: The entire tree that covers all leaf nodes
    # Input R: Root node of the entire tree
    # Input M: Maximum number of subtrees in per fragment
    # Output O : List of (S, minr, maxr):
    #   S: Subtrees covering the group.
    #   minr: Lower bound of Subgroup Range
    #   maxr: Upper bound of Subgroup Range
    O=[]
    S=[]
    depth=int(math.log(len(T)+1,2)-1)

def rightmost_leaf_number(n):
        # Input n: subtree root node
        # Output y: rightmost leaf number under the subtree
        h=n.index.len  # hierarchy level of node n
        x=int(n.index.val, 2)  # node index in decimal
        y=(x+1)*(2**(depth-h))-1
        return y def fragment(S):
        minr=0
        N=math.ceil(float(len(S))/M)
        i=0
        while i<N:
            if i+1<N: # Non-last fragment
                F=S[i*M:(i+1)*M] # Extract M subtrees
                maxr=rightmost_leaf_number(F[-1])
            else: # Last fragment
                F=S[i*M:] # Extract remaining subtrees
                maxr=2**depth-1
            O.append((F, minr, maxr))
            minr=maxr+1
            i=i+1
        return O def check(n):
        # Input n: subtree root node
        # Output 0, 1
        #  0 : Some node in the subtree is a non-member of the group.
        #  1 : All nodes in the subtree are members of the group.
        if n.left==None and n.right==None:  # n is leaf
            if n.index.val in I:
                S.append(n)
                return 1
            return 0
        # n is non-leaf
        lval=check(n.left)
        rval=check(n.right)
        if lval*rval>0:
            S.remove(n.left)
            S.remove(n.right)
            S.append(n)
            return 1
        return 0
    check(R)
    O=fragment(S)
    return O
```

COMMUNICATION CONTROL DEVICE, COMMUNICATION CONTROL METHOD, AND COMPUTER PROGRAM PRODUCT

CROSS-REFERENCE TO RELATED APPLICATION

This application is a continuation of PCT International Application No. PCT/JP2014/079138, filed on Oct. 31, 2014; the entire contents of which are incorporated herein by reference.

FIELD

Embodiments of the present invention are related to a communication control device, a communication control method, and a computer program product.

BACKGROUND

In order to efficiently manage a large number of devices connected via a network, there are methods in which the devices are managed in groups. Regarding the methods for managing devices in groups, a static management method is known in which a predetermined group structure is used, and a dynamic management method is known in which groups are generated and deleted according to the situation.

In the dynamic group management method, although it is possible to perform flexible management according to the situation, the issue is to ensure scalability.

BRIEF DESCRIPTION OF THE DRAWINGS

FIG. 5 is a flowchart for explaining a communication control operation according to the first embodiment;

FIG. 6 is a flowchart for explaining a generation operation according to the first embodiment;

FIG. 7 is a flowchart for explaining a Check( ) function in the case of priority to the left side;

FIG. 9 is a diagram illustrating a pseudo code for performing the generation operation in the case of priority to the left side;

FIG. 15 is a diagram illustrating a pseudo code for performing the generation operation according to the first modification example in the case of priority to the left side;

DETAILED DESCRIPTION

Figure 1:
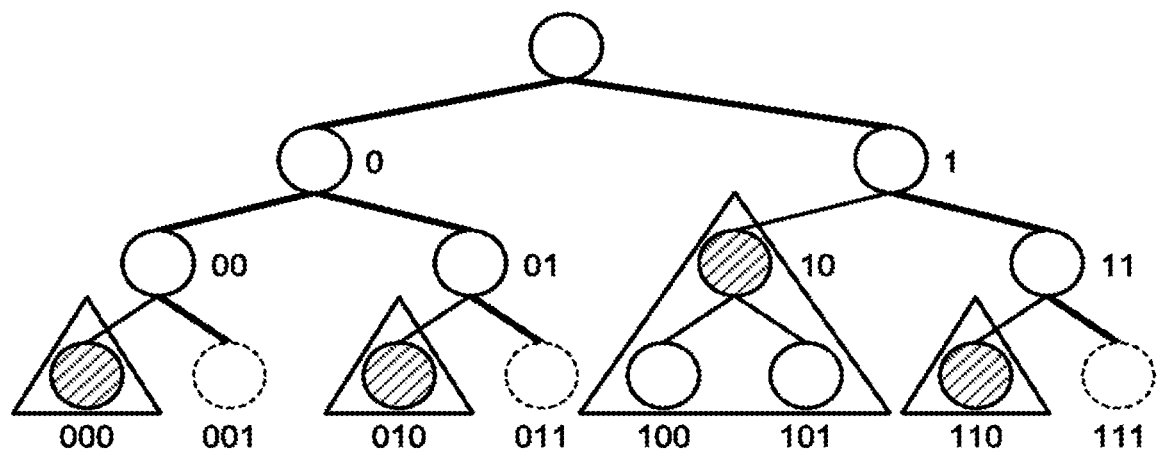
FIG. 1 is a diagram illustrating an exemplary structure of a group management tree according to embodiments.

According to one embodiment, a communication control device includes a receiving unit, a generating unit, and an output unit. The receiving unit receives input of a binary tree in which each leaf node has an index and a node key assigned thereto, and receives input of node IDs that, from among the leaf nodes, enable identification of the leaf nodes belonging to a group. The generating unit generates, using the node key assigned to the root node of partial tree of the binary tree which includes only the leaf nodes identified by the node IDs, a cipher text by encrypting a group key shared in the group, and generates set information containing the generated cipher text. The output unit outputs the set information at least to the communication devices that are associated to the leaf nodes belonging to the group.

Exemplary embodiments of a communication device according to the present invention are described below in detail with reference to the accompanying drawings.

First Embodiment

GDOI (The Group Domain of Interpretation) represents a technology in which participation and withdrawal of group members as well as secure distribution of group keys is done using multicasting. In GDOI, it is possible to create groups, update groups, and distribute group keys. However, in GDOI, every time a group member is updated, key information (LKH_DOWNLOAD_ARRAY) having a hierarchical structure gets updated in almost all members. For that reason, in the case in which a single communication device belongs to a plurality of groups, the individual communication device needs to hold a plurality of LKH_DOWNLOAD_ARRAY, thereby making efficient management a difficult task to perform.

In that regard, in a first embodiment, group operations are performed using the media key block (MKB) technology. As a result of using MKBs, affiliation to a plurality of groups can be efficiently managed using a single device key (a key ring equivalent to LKH_DOWNLOAD_ARRAY).

For example, as a result of using a group management tree (described later in detail), it is possible to obtain range information indicating the range of communication devices belonging to a group, and to obtain an MKB (MKB fragments) that enables management of the communication devices falling in the range indicated by the range information. Meanwhile, group affiliation can be managed (determined) even without using MKBs. For example, as long as set information (described later in detail) and range information generated from a group management tree can be obtained, it is possible to determine whether or not a communication device belongs to a group. In this case, an MKB (MKB fragments) need not be generated.

An MKB represents data that, when operations are performed using the device key corresponding thereto, enables derivation of a media key for the purpose of decoding the contents recorded in a medium. An MKB includes one or more elements. A typical MKB includes one or more cipher texts (elements) that are generated by encrypting a single media key using one or more device keys. Moreover, an MKB can include information that enables identification of the device key to be used in processing each cipher text. The number of cipher texts included in an MKB is dependent on the corresponding device key. Hence, depending on the corresponding device key, an MKB may sometimes include an enormous number of cipher texts as elements.

In the first embodiment, a media key obtained as a result of processing an MKB is used as a group key that is shared among one or more communication devices belonging to the group. That is, such an MKB is distributed which enables derivation of the group key by performing operations using the device keys held by the communication devices belonging to the group. In this way, making use of the fact that the group key can be distributed only to the communication devices belonging to the group, group management of the communication devices is performed. Since the media key is used as the group key, an MKB can be alternatively expressed as a group key block (GKB).

In the case of performing group management (operations) using an MKB, control is performed in such a way that a member that was able to process the MKB and retrieve the group key belongs to the corresponding group (if that member is not belonging to the corresponding group at present, it newly participates in the group). Moreover, control is performed in such a way that a member that failed in obtaining a group key does not belong to the corresponding group (if that member is belonging to the corresponding group at present, it withdraws from the group).

However, if the number of target members becomes enormously large, it is likely that the MKB for group operations becomes extremely large in size. Thus, if the MKB is distributed as it is in a communication network, it is likely that the communication load becomes extremely large.

In that regard, in the first embodiment, in order to reduce the network load, an MKB that includes a plurality of cipher texts as elements is sent after being divided. However, under the premise of the group control method described above, even if an MKB is sent after being divided simply on the basis of cipher texts, there are times when the group control cannot be performed as intended. For example, if a communication device receives an MKB in the divided form but cannot obtain the group key from that MKB, then the communication device withdraws from the group. However, in reality, an MKB that would be processible by the concerned communication device for obtaining the group key may arrive at a latter timing.

In order to avoid such a situation, an MKB is attached with information that enables deciding on the set of communication devices to be subjected to group operations using that MKB. For example, the range of device IDs enabling identification of the target communication devices can be used as the information that enables deciding on the set of communication devices. For example, in the case in which numerically successive device IDs are assigned, a first device ID and a second device ID can be used to express the set of device IDs belonging to the range identified by the first device ID and the second device ID. Herein, device IDs between the first device ID and the second device ID including the first device ID and the second device ID belong to the concerned set. Meanwhile, if the device IDs are assigned according to a rule; then, as described earlier, the range can expressed using two device IDs, and device IDs within that range can be identified according to the rule or it can be determined whether or not a device ID is included in that range. A communication device that receives an MKB attached with information enabling deciding on the range of communication devices performs operations as given in the following pseudo code.

check whether or not the concerned communication device is included in the specified range;

```
if (included in the set) {
    process the MKB;
    if (the group key is successfully obtained) {
        if (currently belonging to the group)
            update the group;
        }
        else { if (currently not belonging to the group) {
            participate in the group;
        }
    }
    else {
        if (currently belonging to the group) {
            withdraw from the group;
        }
    }
}
```

The concerned communication device checks whether or not it itself is included in the specified set (range). If included in the specified set, the communication device processes the MKB using the device key held therein; successfully obtains the group key; and, if it is already participating in the group, updates information of the participating group using the derived group key. On the other hand, if the communication device successfully obtains the group key but is not participating in the group, it participates in the group using the derived group key. Moreover, if the communication device fails in obtaining the group but is already participating in the group, it withdraws from the group.

In this way, in the first embodiment, firstly, the communication device checks whether or not it itself is the target device for group operations. If it is not the target device for group operations, the communication device does not perform group operations. As a result, also using an MKB in the divided form, it becomes possible to ensure that unintentional group withdrawal does not occur.

Given below is the explanation of a structure of an MKB used in the embodiments. FIG. 1 is a diagram illustrating an exemplary structure of the group management tree that is used in an MKB according to the embodiments. As illustrated in FIG. 1, in the embodiments, a group management tree is used that has the complete binary tree structure according to the Complete Subtree (CS) method. For example, the complete binary tree either can be a tree covering all communication devices in the target system (a complete binary tree T) or can be a tree that covers a set of only some communication devices from among all communication devices in the target system (a partial tree T' of the complete binary tree T). The following explanation with reference to FIG. 1 is given under the assumption that the complete binary tree T is used.

As described earlier, each communication device has a unique device ID in the target system. Each leaf node of the complete binary tree T corresponds to a single communication device. Thus, managing the communication devices in groups can be translated as managing the leaf nodes in groups.

A leaf node has an index which is equivalent to the device ID of the corresponding communication device. The leaf nodes illustrated by dashed-line circles represent nodes (revoke nodes) that have been revoked (withdrawn from the group). Moreover, heavy lines represent edges in the paths from the root to the revoke nodes. Furthermore, triangles represent partial trees (partial trees s) that include only the unrevoked leaf nodes. Moreover, the filled nodes represent the root node of the respective partial trees s.

Each node in the complete binary tree T might be assigned with a different cryptographic key (node key). Each communication device might have a device key, which includes node keys assigned to the nodes in the path from the root node of the complete binary tree T to the corresponding leaf node, set therein in advance.

Meanwhile, alternatively, assignment of node keys and setting of device keys need not be performed. For example, in the case of managing groups without using MKBs as described earlier, since MKBs need not be generated, assignment of node keys and setting of device keys becomes redundant.

Meanwhile, to each node, at least information (a node ID) enabling identification of that node is assigned as an attribute. A node ID is expressed as, for example, (d (node depth), b (bitmap)). The depth d of a node n is expressed as $(H_T-H_n)$. Herein, the node n represents each node included in the complete binary tree T. Moreover, $H_T$ represents the height of the complete binary tree T, and $H_n$ represents the height of the concerned node n. Regarding the node identified by the node ID (d, b), the index index(b, d) is expressed as the value of the first d number of bits of the bitmap b.

The bitmap b is, for example, a value including one or more of "0" or "1" as illustrated in FIG. 1. Regarding the path from the root node to a leaf node in the complete binary tree T, the index illustrated in FIG. 1 is obtained by assigning "0" when the path moves to the left and by assigning "1" when the path moves to the right.

An MKB generated from the group management tree includes the following elements, for example. Herein, i represents the root node of the partial tree s.

(index of node i, Enc(node key of node i, group key))

In the example of the group management tree illustrated in FIG. 1, an MKB including the following four elements is generated. The four elements respectively correspond to nodes 000, 010, 10, and 110. Herein, Kg represents a group key, and Enc(k(000, Kg) represents, for example, data obtained by encrypting Kg using k(000).

(000, Enc(k(000), Kg), (010, Enc(k(010), Kg), (10, Enc(k(10), Kg), (110, Enc(k(110), Kg)

In the first embodiment, an MKB having such a structure is divided into a plurality of MKBs (MKB fragments) each of which includes some of the elements; and the MKB fragments obtained by division are sent to the communication devices via multicast communication or broadcast communication.

Figure 2:
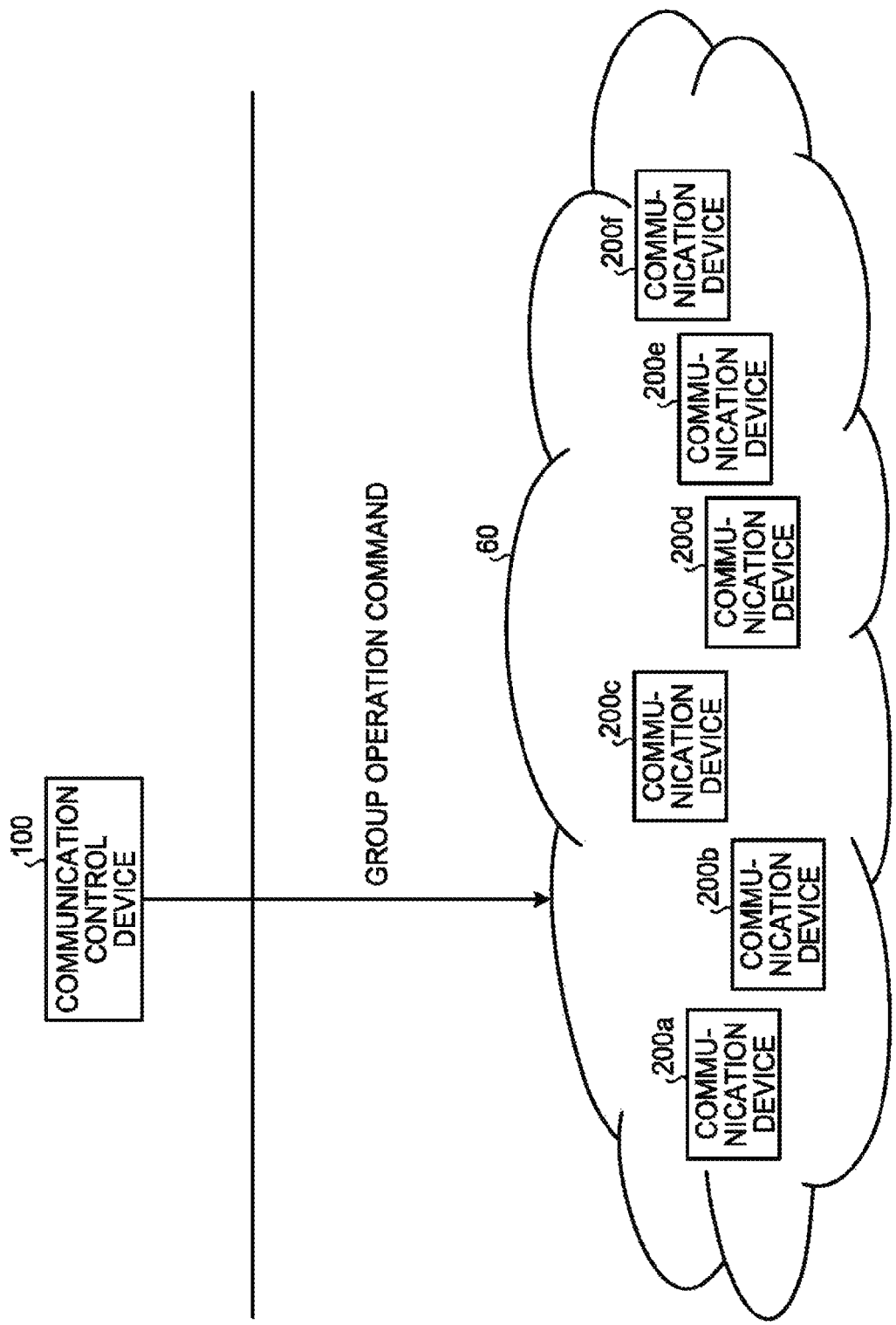
FIG. 2 is a block diagram of a communication system according to a first embodiment.

Given below is the explanation of the details of the first embodiment. FIG. 2 is a block diagram illustrating an exemplary configuration of a communication system according to the first embodiment. As illustrated in FIG. 2, in the communication system according to the first embodiment, communication devices 200a to 200f are connected to a communication control device 100 via a network 60. Herein, the network 60 can have any network form such as the Internet. Thus, the communication devices 200a to 200f need not be directly connected to the communication control device 100.

Meanwhile, there need not be only a single communication control device 100, and the configuration may have two or more communication control devices. The communication devices 200a to 200f have an identical configuration. Hence, in the following explanation, sometimes simply the term "communication device 200" is used. Moreover, the number of communication devices 200 is not limited to six.

As illustrated in FIG. 2, in the first embodiment, the communication control device 100 sends a group operation command to each communication device 200. A group operation command includes, for example, set information and range information (for example, the range of device IDs). Moreover, a group operation command may also include the group ID that enables identification of the post-updating group.

The set information represents information about a set of a predetermined number of partial trees (for example, the partial trees s illustrated in FIG. 1) that include only such leaf nodes (corresponding to the communication devices) which belong to a group. For example, the set information can contain an MKB in the divided form (MKB fragments), so that the communication devices associated to the leaf nodes of the partial trees included in the set can derive the group key. In this way, in the first embodiment, instead of sending an MKB in entirety, MKB fragments that are obtained by division corresponding to sets of the set information, each of which is generated to contain a predetermined number of partial trees s, are sent to the communication devices 200.

The range information indicates the range of indices assigned to the leaf nodes of each partial tree included in the set indicated by the set information. As described earlier, since an index is equivalent to the device ID of the corresponding communication device, the range information enables identification of the range of device IDs of the communication devices to be subjected to group operations. The details regarding the method of generating the set information and the range information are given later.

Figure 3:
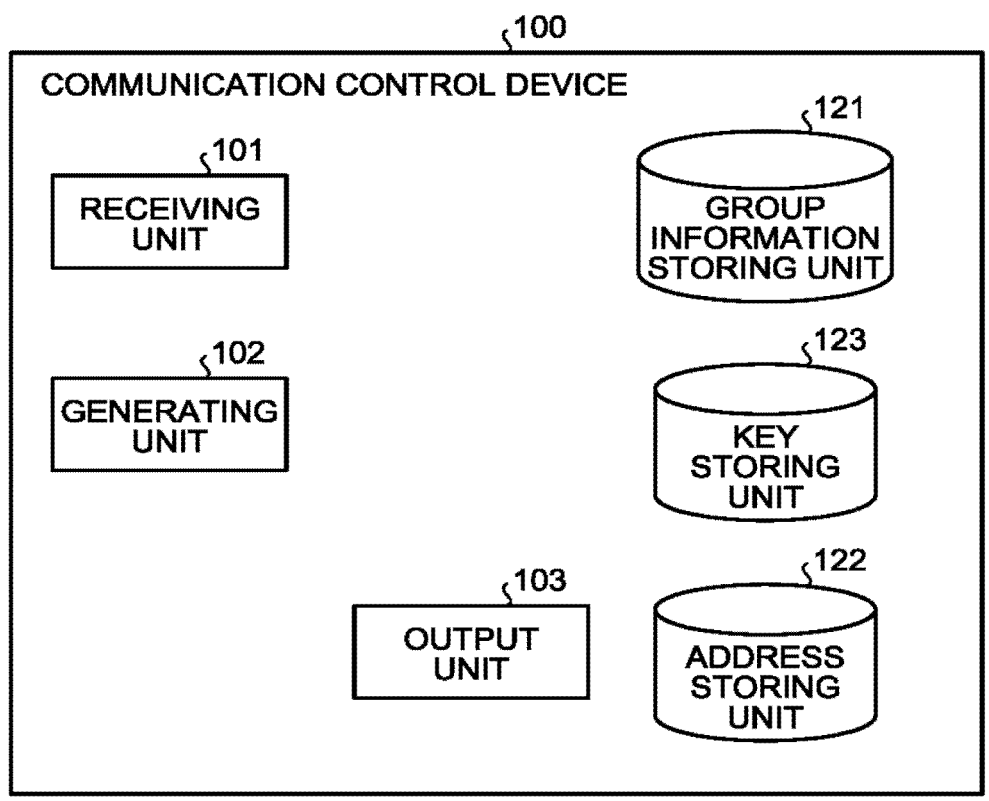
FIG. 3 is a block diagram of a communication control device according to the first embodiment.

FIG. 3 is a block diagram illustrating an exemplary configuration of the communication control device 100. As illustrated in FIG. 3, the communication control device 100 includes a group information storing unit 121, an address storing unit 122, a key storing unit 123, a receiving unit 101, a generating unit 102, and an output unit 103.

The group information storing unit 121 is used to store group information that contains group IDs of groups to which one or more communication devices 200 belong, and that contains device IDs enabling identification of the communication devices 200 belonging to the groups identified by the group IDs. That is, the group information storing unit 121 is used to store group IDs in a corresponding manner to device IDs of the communication devices 200 belonging to the groups identified by the group IDs.

In the first embodiment, in the group information storing unit 121, one or more group IDs are stored in advance. However, alternatively, the group information storing unit 121 may not be disposed, and group operations can be performed based on the group information received from an external device.

The address storing unit 122 is used to store information (multicast group IDs or multicast addresses), which enables identification of multicast groups to which one or more communication devices 200 belong, in a corresponding manner to the device IDs of the communication devices 200 belonging to the multicast groups. Herein, multicast groups represent an example of groups that are managed independently of the groups to be subjected to group operations using MKBs. Moreover, a multicast address represents, for example, an address for sending information to the communication device 200 having the corresponding device ID. Meanwhile, in the case of not using multicast communication (for example, in the case of using broadcast communication), the address storing unit 122 may not be disposed.

In the first embodiment, the address storing unit 122 is used to store, in advance, the information enabling identification of multicast groups. However, alternatively, the configuration can be such that, based on information received from an external device, information is newly added in the address storing unit 122 or the already-stored information is updated.

The key storing unit 123 is used to store the device keys that are assigned to the communication devices 200. When MKBs are generated according to the CS method, the key storing unit 123 can store the devices keys in a corresponding manner to the nodes of the tree structure. Meanwhile, in the case of only managing groups without using MKBs as described earlier, the key storing unit 123 may not be disposed.

The receiving unit 101 receives input of a variety of information used in the communication control device 100. For example, the receiving unit 101 receives a variety of information from external devices such as the communication devices 200. For example, the receiving unit 101 receives requests for group control and receives information specifying the targets for group control. A request for group control represents a request for newly creating a group or a request for changing a group (changing the communication devices 200 belonging to a group). For example, the receiving unit 101 can be configured to receive the group ID of the target group for operations and the device ID of the communication device 200 to be added to the concerned group as input by an operator using an operating unit (not illustrated) such as a keyboard. Meanwhile, group control can be performed not only when a request for group control is received from an external device, but can be performed also when the necessity determination regarding group control is done in the communication control device 100 and group control is determined necessary.

Moreover, the receiving unit 101 receives input of the group management tree to be processed that has the complete binary tree structure (either the complete binary tree T representing the entire tree or the partial tree T' of the complete binary tree T), as well as receives input of the node IDs of the leaf nodes corresponding to the communication devices 200 belonging to the group. Herein, since each leaf node corresponds to one of the communication devices 200, it is alternatively possible to receive input of the device IDs of the communication devices 200 belonging to the group. Then, the receiving unit 101 can obtain the node IDs of the nodes corresponding to the communication devices 200 having the input device IDs. The receiving unit 101 sends, to the generating unit 102, the group management tree having the complete binary tree structure, the node IDs, a request for group control, and information specifying the targets for group control (input information).

The generating unit 102 generates information to be used in group operations. For example, the generating unit 102 generates the set information and the range information described earlier. The generating unit 102 traces a group management tree having the complete binary tree structure, and generates the range information while calculating the set information. For example, the generating unit 102 repeatedly performs, either from the leftmost leaf node toward the rightmost leaf node or from the rightmost leaf node toward the leftmost leaf node, a tracing operation that includes an operation of obtaining set information, which indicates a set of a predetermined number of (M (natural number)) partial trees (partial trees of the group management tree) each including only the leaf nodes identified by node IDs, and an operation of obtaining the range information of the indices of the leaf nodes included in the obtained set. As a result, the amount of calculation can be considered as O(L) (where L represents the number of leaf nodes). Meanwhile, the details of the generation operation performed by the generating unit 102 are given later.

The output unit 103 outputs the set information and the range information at least to the communication devices 200 associated to the leaf nodes belonging to the group. As described earlier, the set information can also contain key information (MKB fragments) that enables the communication devices 200, which are associated to the leaf nodes of the partial trees included in the set, to derive the group key. For example, as described earlier, an MKB fragment is expressed in the format of (index of node i, Enc(node key of node i, group key)).

For example, the output unit 103 sends, via multicasting, a group operation message including the set information and the range information to the multicast groups to which belong the communication devices 200 belonging to the group. In this way, the output of the output unit 103 is allowed to reach even those communication devices 200 which are not to be subjected to a group change. Hence, as compared to a case in which the output is not allowed to reach, it becomes possible to reduce the calculation cost required for the determination of the output destinations by the output unit 103.

Moreover, the output unit 103 can be configured to output the abovementioned information to such multicast group that include the communication devices 200 included in the pre-updating group but not included in the post-updating group. Although such communication devices 200 belong to the multicast group, they cannot correctly process MKBs and hence withdraw from the post-updating group. In this way, a command for withdrawal from the group can be issued using an MKB in the divided form. As a result of issuing such a command, the communication devices 200 can appropriately manage the information which needs to be retained.

Alternatively, a command for withdrawal as described above need not be sent to the communication devices 200 that are not included in the post-updating group. That is because the communication devices 200 that are not included in the post-updating group cannot derive the post-updating group key in response to a command for updating, and hence cannot participate in the post-updating group. As a result of such a configuration, the number of commands that need to be issued by the communication control device 100 may be reduced.

The output unit 103 outputs the output information to such a set of communication devices 200 which represents the set (group) of the communication devices 200 managed independently of the target groups for group operations using MKBs and which includes at least all communication devices 200 subjected to group updating. Herein, a set of communication devices 200 implies a collection of a plurality of communication devices 200, and need not always match with the group assigned with a group ID. Examples of a set of communication devices 200 include a set of communication devices 200 that receive data via multicast communication; and a set of communication devices 200 that receive data via broadcast communication, that is, a set of all communication devices 200. For example, the output unit 103 can send the output information using one or more multicast communications or broadcast communications to a set of communication devices 200 that include a device ID list or to a group. In the case of sending the output information using multicast communication, the output unit 103 sends the output information to one or more addresses (multicast addresses) that, from among the addresses stored in the address storing unit 122, are associated to the target device IDs for distribution.

Figure 4:
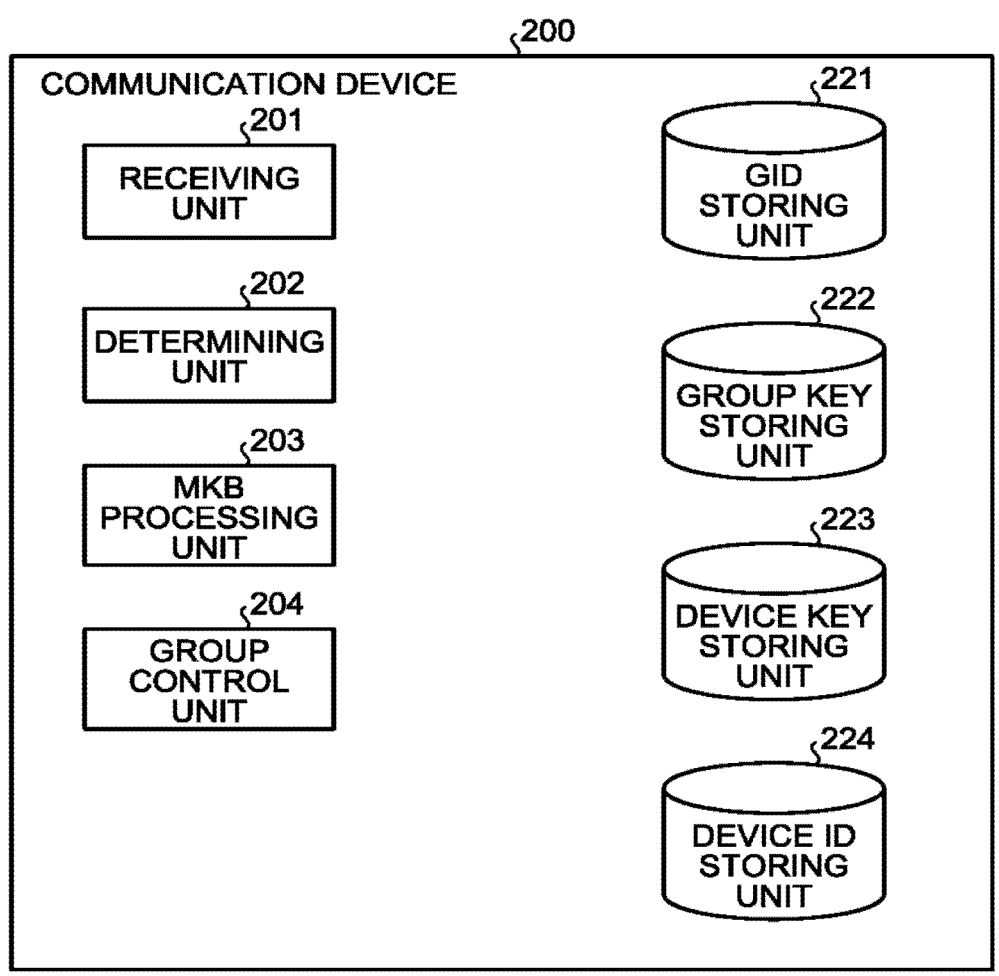
FIG. 4 is a block diagram of a communication device according to the first embodiment.

FIG. 4 is a block diagram illustrating an exemplary configuration of the communication device 200. As illustrated in FIG. 4, the communication device 200 includes a GID storing unit 221, a group key storing unit 222, a device key storing unit 223, a device ID storing unit 224, a receiving unit 201, a determining unit 202, an MKB processing unit 203, and a group control unit 204. In the case of not using MKBs, the group key storing unit 222 and the device key storing unit 223 need not be disposed.

The GID storing unit 221 is used to store the group ID (GID) of the group to which the corresponding communication device 200 belongs. The group key storing unit 222 is used to store the group key of the group identified by the group ID stored in the GID storing unit 221. The device key storing unit 223 is used to store the device key of the corresponding communication device 200. The device ID storing unit 224 is used to store the device ID of the corresponding communication device 200.

The receiving unit 201 receives a variety of information from external devices such as the communication control device 100 and the other communication devices 200. For example, the receiving unit 201 receives a group operation message from the communication control device 100. Moreover, the receiving unit 201 receives output information via multicast communication or broadcast communication, for example. Then, the receiving unit 201 determines whether or not the received message is a group operation message. If the received message is not a group operation message, the message is sent to another module (not illustrated) that needs to process the message. When the received message is a group operation message, the data of the message is sent to the determining unit 202.

The determining unit 202 determines whether or not the range information specified in a group operation message contains the device ID stored in the device ID storing unit 224. If the device ID is not included, it implies that the concerned communication device 200 is not the target device for group operation messages. Hence, the operations with respect to the concerned group operation message are stopped. On the other hand, when the device ID is included, it implies that the concerned communication device 200 is the target device for group operation messages. Hence, the group operation message is sent to the MKB processing unit 203.

When it is determined that the device ID stored in the device ID storing unit 224 is included in the range information, the MKB processing unit 203 performs MKB processing for generating a group key based on the set information (the MKB fragments) specified in the group operation message and based on the device key stored in the device key storing unit 223.

For example, when a MKB fragment is expressed as (index of node i, Enc(node key of node i, group key)) as mentioned earlier, the MKB processing unit 203 generates a group key using Dec(node key of node i, MKB fragment).

If a group key can be obtained as a result of the MKB processing, it implies that the concerned communication device 200 belongs to the group identified by the GID. Then, the MKB processing unit 203 sends the GID and the obtained group key to the group control unit 204.

Meanwhile, the method for determining the affiliation to a group is not limited to this method. For example, in the case of using set information that does not contain MKB fragments, the communication device 200 can be determined to belong to the group if the node index (d, b) having the bitmap of the device ID of the communication device 200 matching with the prefix upper d number of bits is included in the set information.

The group control unit 204 stores the GID in the GID storing unit 221, and stores the group key in the group key storing unit 222. If an already-stored GID is present, the group control unit 204 updates the GID stored in the GID storing unit 221 with the GID specified in the group operation message.

Meanwhile, if the group key cannot be obtained as a result of the MKB processing, it implies that the concerned communication device 200 does not belong to the group identified by the GID. Thus, in case the communication device 200 is belonging to the group, it needs to withdraw from the group. For that reason, the MKB processing unit 203 sends the GID and a notification about the failure to obtain the group key to the group control unit 204.

The group control unit 204 empties the GID storing unit 221 and the group key storing unit 222. If the GID and the group key are already stored, the group control unit 204 deletes them.

Meanwhile, each of the abovementioned storing units can be configured using any type of commonly used memory medium such as a Hard Disk Drive (HDD), an optical disk, a memory card, or a Random Access Memory (RAM).

Moreover, the receiving unit 101, the generating unit 102, and the output unit 103 of the communication control device 100; as well as the receiving unit 201, the determining unit 202, the MKB processing unit 203, and the group control unit 204 of the communication device 200 can be implemented, for example, by making one or more processors such as a Central Processing Unit (CPU) to execute programs, that is, can be implemented using software; or can be implemented using hardware such as one or more Integrated Circuits (IC); or can be implemented using a combination of software and hardware.

Explained below with reference to FIG. 5 is a communication control operation performed by the communication control device 100 according to the first embodiment. FIG. 5 is a flowchart for explaining an example of the communication control operation according to the first embodiment.

The receiving unit 101 receives the complete binary tree T (or the partial tree T' of the complete binary tree T), and receives the node IDs of the leaf nodes corresponding to the communication devices 200 belonging to a group (Step S101). Alternatively, the device IDs of the communication devices 200 belonging to the group can be received, and the node IDs of the leaf nodes corresponding to the communication devices 200 having the received device IDs can be obtained. Then, based on the complete binary tree T (or the partial tree T') and the node IDs, the generating unit 102 performs a generation operation for generating set information and range information (Step S102). Subsequently, the generating unit 102 generates a group operation message that includes the set information and the range information. The output unit 103 outputs the group operation message (Step S103).

Given below are the details of the generation operation performed at Step S102. In the generation operation, a tracing operation is recursively performed from a root node R of the partial tree T' of the complete binary tree T with priority to the left side or with priority to the right side. Herein, priority to the left side implies generation of the set information and the range information in a sequential manner from the leftmost leaf node of the partial tree T' toward the rightmost leaf node. Alternatively, priority to the right side implies generation of the set information and the range information in a sequential manner from the rightmost leaf node of the partial tree T' toward the leftmost leaf node. The generating unit 102 can generate the set information either with priority to the left side or with priority to the right side.

The generation operation results in the output of a list S of node IDs of at most M number of nodes and results in the output of a list O of sets (S, min r, max r) where min r represents the lower limit value and max r represents the upper limit value of the indices of the leaf nodes corresponding to the list S. Herein, the list S is equivalent to the set information, and min r and max r are equivalent to the range information. In the following explanation, addition of the node ID of a node n in the list S is sometimes simply expressed as addition of the node n in the list S.

In the following explanation, regarding a partial tree in which the node n is the root node, LML(n) and RML(n) represent the functions that return the node index of the leftmost leaf node and the rightmost leaf node, respectively. Moreover, a set L represents the set of leaf nodes of the partial tree T'. Furthermore, a set G represents the set of leaf nodes, from among the set L, that belong to the group.

The generation operation includes the following steps, for example.
(S1) Initialize O and S to NULL, initialize min r to LML(R), and initialize max r to RML(R).
(S2) Regarding a node C being currently traced, in the case in which the node C is included in the set L; when included in the set G, add the node C in the list S and mark it as "CS applicable". However, when not included in the set G, mark the node C as "CS non-applicable".
(S3) If the node C is not included in the set L and if the child nodes on the left and right sides of the node C are marked as "CS non-applicable", then the node C is marked as "non CS applicable".
(S4) If the node C is not included in the set L and if the child nodes on the left and right sides of the node C are marked as "CS applicable", then the node C is marked as "CS applicable" as well as the child nodes on the left and right sides are removed from the list S and the node C is added to the list S.
(S5) If the node C is not included in the set L and if the child node on one side of the node C is marked as "CS applicable" but the child node on the other side of the node C is marked as "CS non-applicable", when |S|>M holds true (i.e., when the number of elements in the list S is greater than M), S[0:M] represents the list of M number of nodes from the start of the list S, max r=RML(S[M−1]) represents priority to the left side, and min r=LML(S[M−1]) represents priority to the right side. Then, (S[0:M], min r, max r) is added to the set O; S[0:M] is removed from the list S; min r=max r+1 is set in the case of priority to the left side; and max r=min r−1 is set in the case of priority to the right side.
(S6) When the node C represents the root node R of the partial tree T', max r=RML(R) is set in the case of priority to the left side, min r=LML(R) is set in the case of priority to the right side, and (S, min r, max r) is added to the set O.

The marks "CS applicable" and "CS non-applicable" can be implemented as return values of the function performing operations with respect to the node being currently traced, or can be implemented by holding them as attribute values attached to each node. In the case of holding a mark as an attribute value, either the value corresponding to "CS applicable" can be held, or the value corresponding to "CS non-applicable" can be held, or a value corresponding to "CS not-yet-determined" can be held indicating that it is not yet certain whether or not the node is CS applicable.

When the index of a leaf node is expressed as index (b, d) as mentioned earlier, with respect to the node n identified by the node ID (d, b), LML(n) is expressed as index(b, d)×$2^{(H_T-d)}$ and RML(n) is expressed as (index(b, d)+1)×$2^{(H_T-d)}-1$. For example, when T=T' is satisfied, the node index of the leftmost node of the partial tree T' is LML(R)=$0 \times 2^{(H_T-0)}=0$; while the node index of the rightmost node of the partial tree T' is RML(R)=$(0+1) \times 2^{H_T}-1=2^{H_T}-1$.

In the generation operation, the following information is used as input.
I: a list of device IDs of the communication devices 200 included as group members
T': the partial tree of the complete binary T which represents the entire tree (the root node of T' is R)
M: the MKB fragment size (the number of nodes included in the MKB fragments)

Moreover, in the generation operation, the list O of (S, min r, max r) is output.
S: the list of nodes included in the MKB fragments min r: the lower limit value of the node indices of the leaf nodes with respect to the list S
max r: the upper limit value of the node indices of the leaf nodes with respect to the list S FIG. 6 is a flowchart for explaining an example of the generation operation. The generating unit 102 initializes the parameters to be used in the generation operation (Step S201). For example, the generating unit 102 initializes the list S and the list O to empty (NULL), initializes min r to LML(R), and initializes max r to RML(R).

The generating unit 102 executes a Check( ) function with respect to the root node R (Step S202). The Check( ) function is recursively executed with respect to the child nodes of the specified node, and the list O is output as a result.

FIG. 7 is a flowchart for explaining an example of the Check( ) function in the case of priority to the left side. In FIG. 7 are illustrated operations performed in the case when the Check( ) function having priority to the left side is called with respect to a particular node n.

Firstly, it is determined whether or not the node n is a leaf node (Step S301). If the node n is a leaf node (Yes at Step S301), then it is determined whether or not the node ID of the node n is included in the list I (Step S302). If the node ID of the node n is included in the list I (Yes at Step 3302), then the node n is added to the list S (Step S303). Moreover, rv is set to "1" (Step S304). Herein, rv represents the parameter for setting whether the node is "CS applicable" or "CS non-applicable". In the example illustrated in FIG. 7, rv=1 implies "CS applicable" and rv=0 implies "CS non-applicable". Meanwhile, if the node ID of the node n is not included in the list I (No at Step S302), then rv is set to "0" (Step S305).

At Step S301, if it is determined that the node n is not a leaf node (No at Step S301); lval is set to Check(left-side child node of node n), rval is set to Check(right-side child node of node n), and rv is set to "0" (Step S306).

Subsequently, it is determined whether or not lval×rval is greater than "0" (Step S307). That is equivalent to determining whether the left-side child node as well as the right-side child node is "CS applicable". If lval×rval is greater than "0" (Yes at Step S307), then the left-side child node and the right-side child node of the node n are deleted from the list S; the node n is added to the list S; and rv is set to "1" (Step S308).

Meanwhile, if lval×rval is not greater than "0", that is, if lval×rval is equal to "0" (No at Step S307), then it is determined whether or not (lval+rval) is greater than "0" (Step S309). That is equivalent to determining whether either one of the left-side child node and the right-side child node is "CS applicable".

If (lval+rval) is greater than "0" (Yes at Step S309), then it is determined whether or not the number of elements in the list S has exceeded M (Step S310). If the number of elements in the list S has exceeded M (Yes at Step S310), then max r is set to RML(S[M−1]); (S[0:M], min r, max r) is added to the list O; and min r is set to max r+1 (Step S311).

After the operation at Step S308 or after the operation at Step S311, if it is determined that (lval+rval) is not greater than "0" (No at Step S309) or if the number of elements in the list S is not exceeding M (No at Step S310); then it is determined whether or not the node n is the root node (Step S312).

If the node n is the root node (Yes at Step S312), then max r is set to RML(R), and (S, min r, max r) is added to the list O (Step S313). After the operation at Step S304, or after the operation at Step S305, or after the operation at Step S313, or if the node n is not the root node (No at Step S312); the value of rv is returned (Step S314) and the Check( ) function ends.

Figure 8:
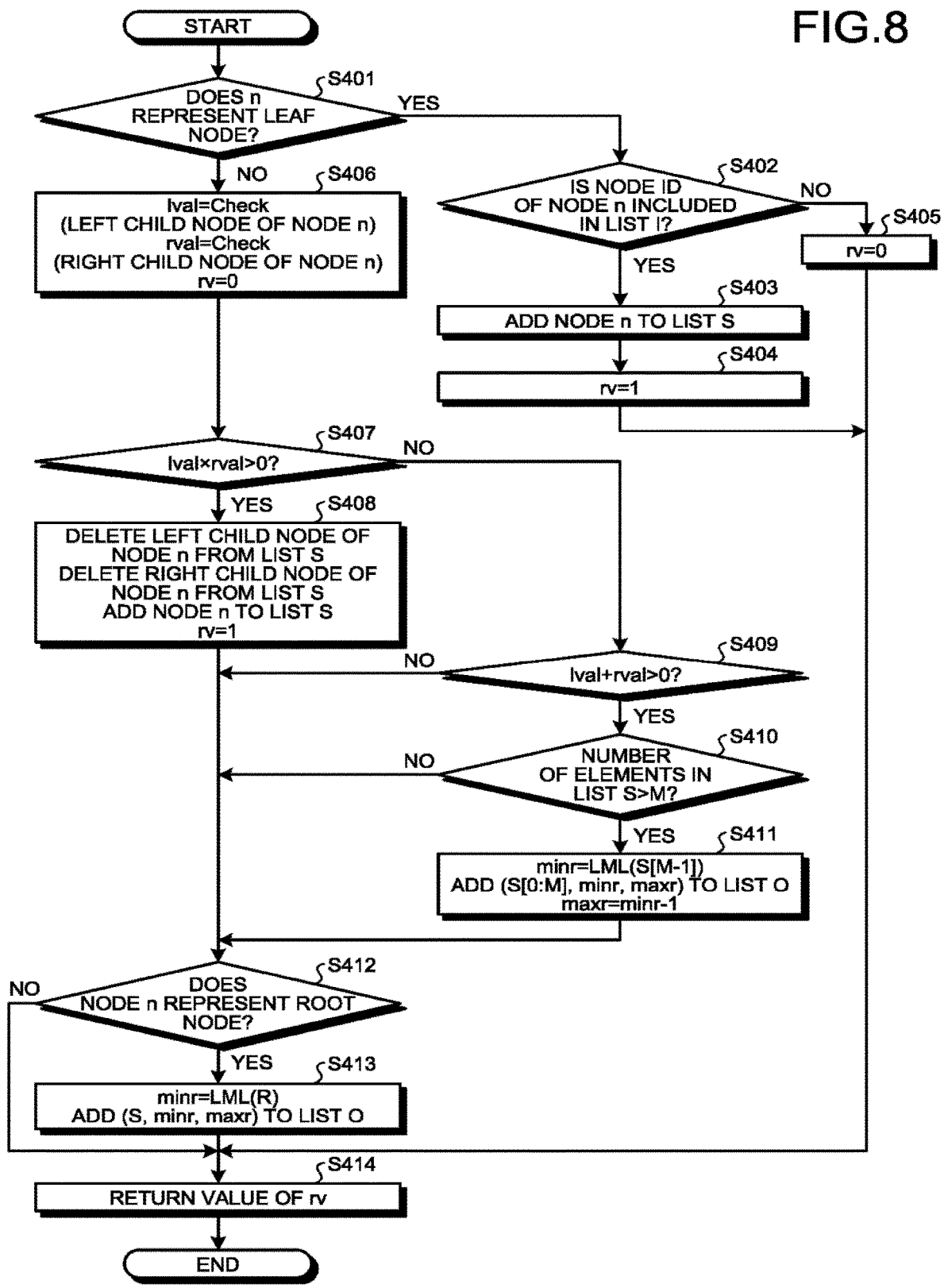
FIG. 8 is a flowchart for explaining the Check( ) function in the case of priority to the right side.

FIG. 8 is a flowchart for explaining an example of the Check( ) function in the case of priority to the right side. In the case of priority to the right side, except for the operations performed at Step S411 and Step S413, the operations are identical to the Check( ) function in the case of priority to the left side (FIG. 7). Hence, the explanation of identical operations is not repeated.

At Step S411, min r is set to LML(S[M−1]); (S[0:M], min r, max r) is added to the list O; and max r is set to min r−1 (Step S411). At Step S413, min r is set to LML(R), and (S, min r, max r) is added to the list O (Step S413).

FIG. 9 is a diagram illustrating an example of a pseudo code for performing the generation operation in the case of priority to the left side. In FIG. 9, Input I, T, R, and M correspond to the list I, the partial tree T', the node R of the partial tree T', and the MKB fragment size M, respectively. Moreover, Output O corresponds to the list O. Furthermore, rightmost_leaf_number(n) corresponds to RML(n).

Figure 10:
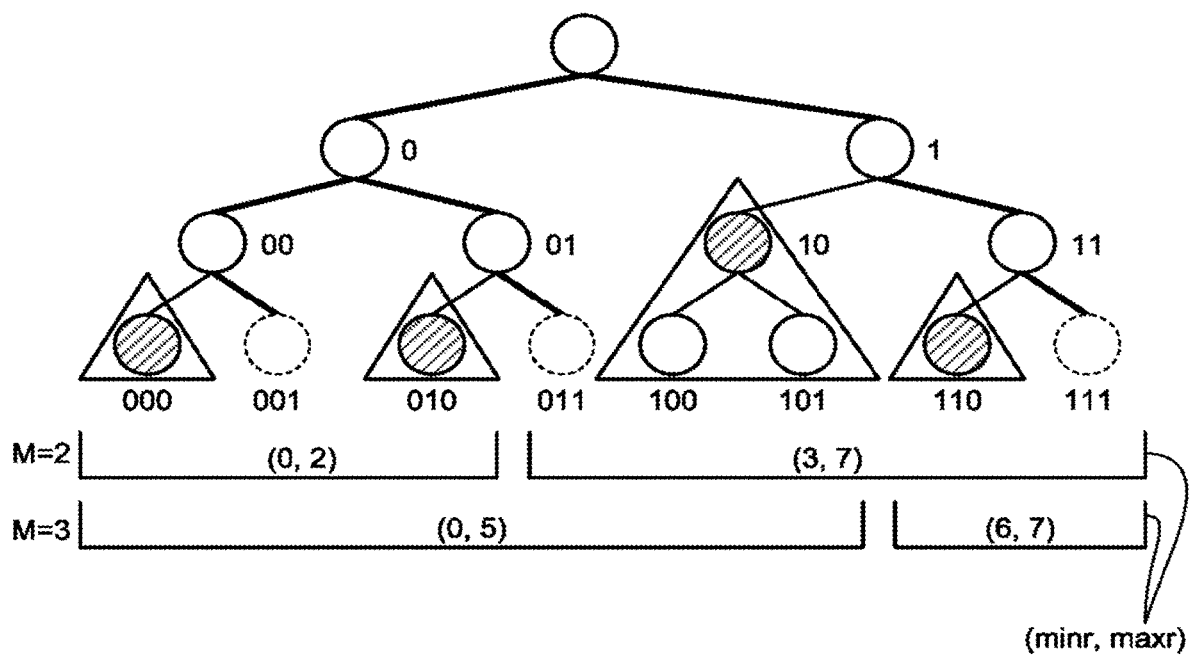
FIG. 10 is a diagram illustrating an example of the result of the generation operation.

FIG. 10 is a diagram illustrating an example of the result of the generation operation. In FIG. 10 is illustrated an example of the result of the generation operation in the case in which T'=T holds true and priority is given to the left side with respect to the complete binary tree T illustrated in FIG. 1, which is the entire tree having $H_T=3$ (the number of leaf nodes is eight).

In the example illustrated in FIG. 10, the following list I is provided as a parameter. Each element of the list I represents a device ID in binary notation.

I=(000, 010, 100, 101, 110)

When M=2 holds true, the list O representing the output of the generation operation includes the following two lists S.

S=[(3,000), (3,010)], (min r, max r)=(0, 2)
S=[(2, 10), (3, 110)], (min r, max r)=(3, 7)

When M=3 holds true, the list O representing the output of the generation operation includes the following two lists S.

S=[(3,000), (3,010), (2, 10)], (min r, max r)=(0, 5)
S=[(3, 110)], (min r, max r)=(6, 7)

In the case of including MKB fragments in the set information, for example, Enc(node key of node i, group key) can be calculated for each node included in the list S, and can be output in a corresponding manner to the index of the concerned node.

As described above, according to the first embodiment, while obtaining partial trees including only the leaf nodes belonging to a group, MKB division (generation of the list S of partial trees each having M number of nodes) can be performed. For that reason, the generated MKB fragments can be sent without having to wait until, for example, all partial trees are obtained. As a result, for example, as compared to a method in which all partial trees are obtained before an MKB is divided into MKB fragments (a first modification example described later), it becomes possible to reduce the amount of calculation and the transmission delay of the MKB fragments.

Figure 11:
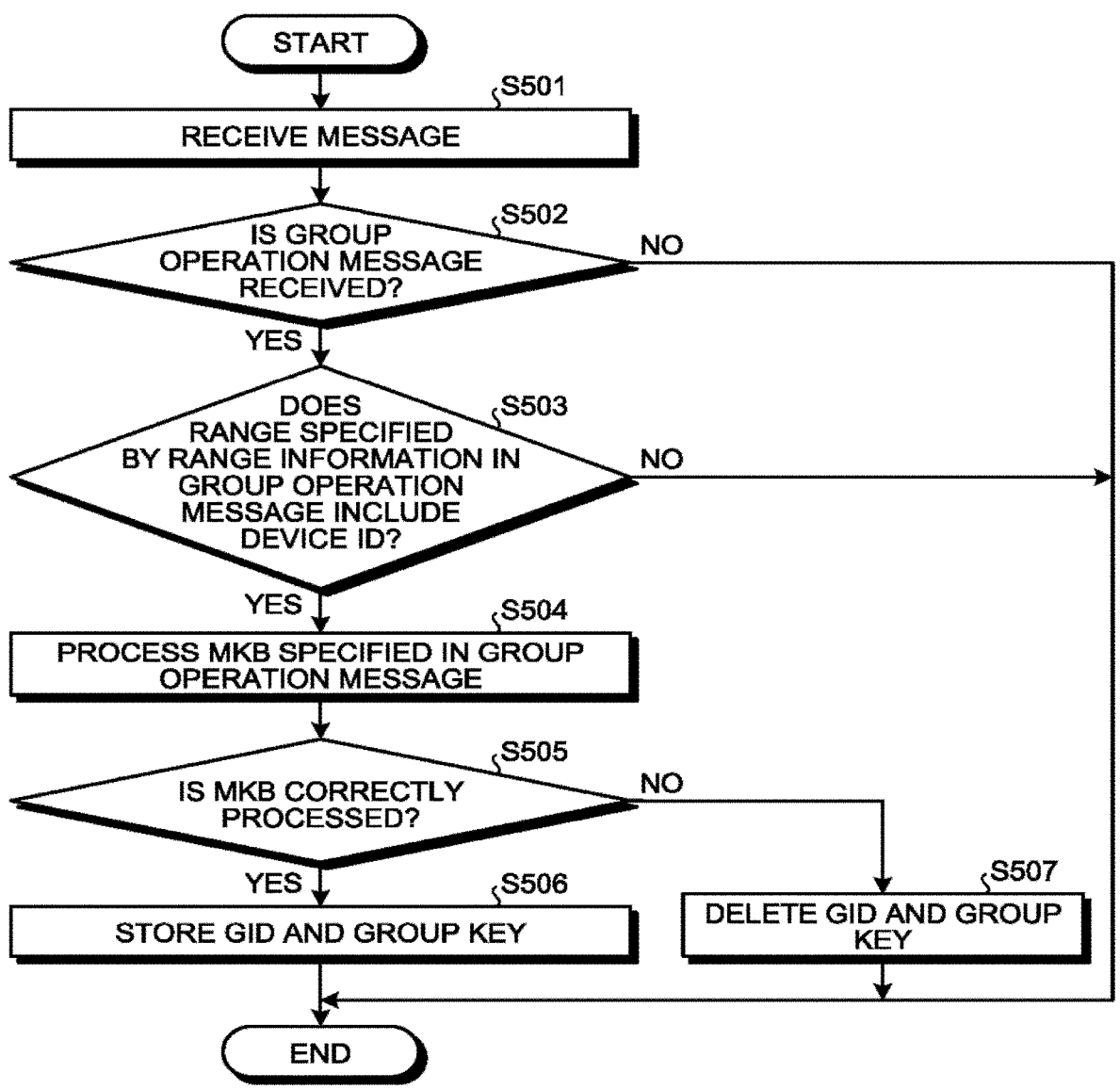
FIG. 11 is a flowchart for explaining a group control operation according to the first embodiment.

Explained below with reference to FIG. 11 is a group control operation performed by the communication device 200 according to the first embodiment. FIG. 11 is a flowchart for explaining an example of the group control operation according to the first embodiment.

The receiving unit 201 receives a message from an external device such as the communication control device 100 (Step S501). The receiving unit 201 determines whether or not the received message is a group operation message (Step S502). If the received message is not a group operation message (No at Step S502), then it marks the end of the group control operation. As described earlier, any message other than a group operation message is sent to the module that needs to process the message, so that the message is appropriately processed.

When the received message is a group operation message (Yes at Step S502), the determining unit 202 determines whether or not the range specified by the range information in the group operation message includes the device ID stored in the device ID storing unit 224 (Step S503).

If the range specified by the range information does not include the device ID (No at Step S503), then the concerned communication device 200 is not the target device for group operation, and it marks the end of the group control operation. When the range specified by the range information includes the device ID (Yes at Step S503), the MKB processing unit 203 processes the MKB fragment specified in the group operation message (Step S504).

The MKB processing unit 203 determines whether or not the MKB (the MKB fragment) is correctly processed (Step S505). If the MKB is correctly processed (Yes at Step S505), then the group control unit 204 stores the GID, which is specified in the group operation message, in the GID storing unit 221 and stores the group key, which is obtained as a result of the MKB processing, in the group key storing unit 222 (Step S506). However, when the MKB is not correctly processed (No at Step S505), the group control unit 204 deletes the GID, which is specified in the group operation message, from the GID storing unit 221 and deletes the group key from the group key storing unit 222 (Step S507).

In this way, in the communication control device according to the first embodiment, dynamic group management can be achieved while ensuring scalability. Moreover, for the purpose of performing group management, instead of sending an entire MKB, information (MKB fragments) obtained by dividing the MKB is sent. That enables achieving reduction in the communication load. At that time, since the information for setting the range of communication devices to be subjected to group operations is sent along with the MKB fragments, unintended group operations can be avoided.

First Modification Example

In the embodiment described above, while obtaining partial trees including only the leaf nodes belonging to a group, an MKB is divided and range information of the MKB in the divided form (MKB fragments) is generated. In a first modification example, a list of sorted partial trees including only the leaf nodes belonging to a group is obtained, and then the list of partial trees is divided to generate MKB fragments. That is followed by the generation of range information of the MKB fragments.

Figure 12:
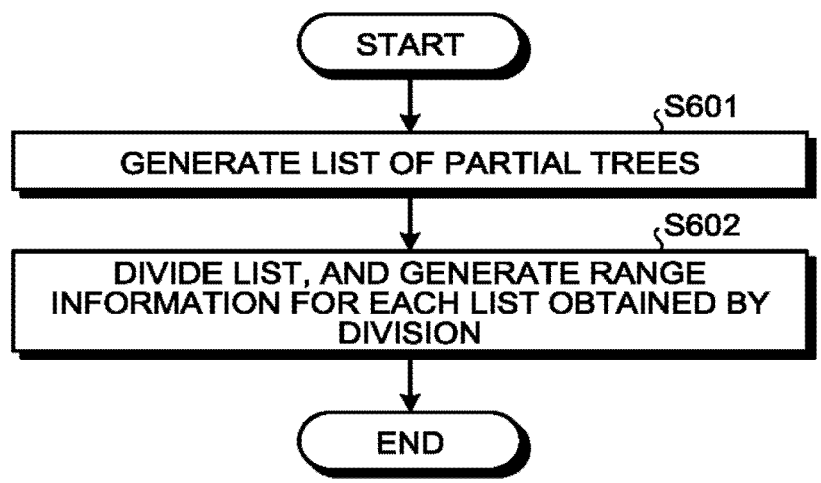
FIG. 12 is a flowchart for explaining a generation operation according to a first modification example.

FIG. 12 is a flowchart for explaining an example of the generation operation according to the first modification example. The generating unit 102 repeatedly performs, either from the leftmost leaf node toward the rightmost leaf node or from the rightmost leaf node toward the leftmost leaf node, an operation of obtaining partial trees each of which includes only the leaf nodes identified by node IDs; and obtains a sorted list of partial trees including one or more partial trees (Step S601). Herein, sorting implies arranging the partial trees in ascending order or descending order of indices. For example, in the case of priority to the left side, the partial trees are sorted in such a way that the node indices of the leftmost leaf node or the rightmost leaf node of the index R of the root nodes of the partial trees (LML(R) or RML(R)) are arranged in ascending order. In the case of priority to the right side, the partial trees are sorted in such a way that the node indices of the leftmost leaf node or the rightmost leaf node of the root nodes of the partial trees (LML(R) or RML(R)) are arranged in descending order.

Subsequently, the generating unit 102 divides the obtained list of partial trees into sets each of which includes a predetermined number (M (natural number) of partial trees, and obtains the range information of the indices that are assigned to the leaf nodes of the partial trees included in each set (Step S602).

In the first modification example, after the list of partial trees is obtained, sets of M number of partial trees (lists of partial trees) are further obtained. For that reason, the amount of calculation becomes equal to O(L+L/M) (where L represents the number of leaf nodes).

Figure 13:
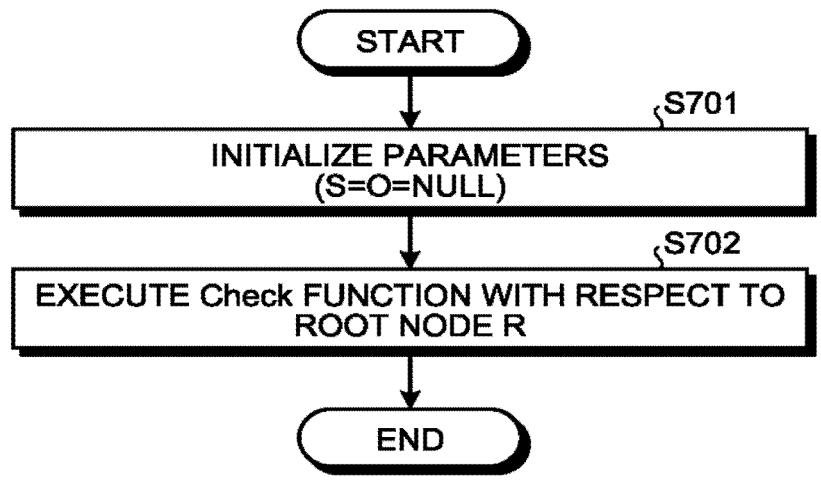
FIG. 13 is a flowchart for explaining a list generation operation.

FIG. 13 is a flowchart for explaining an example of the list generation operation performed at Step S601. The generating unit 102 initializes the parameters to be used (Step S701). For example, the generating unit 102 initializes the list S and list O to empty (NULL). Then, the generating unit 102 executes the Check( ) function with respect to the root node R (Step S702). The Check( ) function according to the first modification example is recursively executed with respect to the child nodes of the specified node, and the list O is output as a result.

Figure 14:
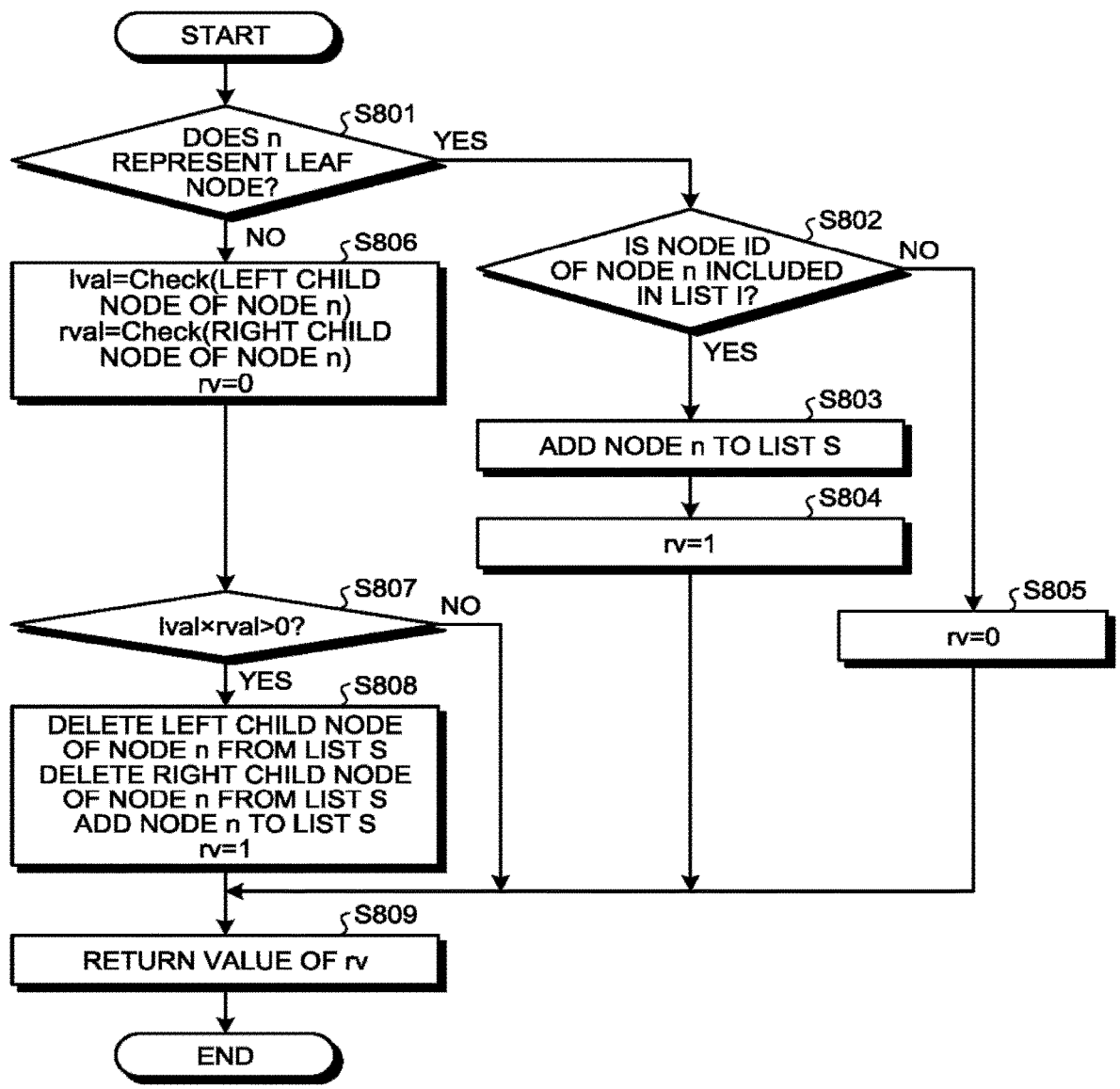
FIG. 14 is a flowchart for explaining the Check( ) function according to the first modification example in the case of priority to the left side.

FIG. 14 is a flowchart for explaining an example of the Check( ) function according to the first modification example in the case of priority to the left side. In FIG. 14 are illustrated operations performed in the case when the Check ( ) function having priority to the left side is called with respect to a particular node n.

The operations from Step S801 to Step S807 are identical to the operations from Step S301 to Step S307 illustrated in FIG. 7. Hence, the explanation is not repeated.

At Step S807, if lval×rval is determined to be greater than "0" (Yes at Step S807), then the left-side child node and the right-side child node of the node n are deleted from the list S; the node n is added to the list S; and rv is set to "1" (Step S808).

On the other hand, if lval×rval is not greater than "0" (No at Step S807), the value of rv is returned after the operation at Step S804, or after the operation at Step S805, or after the operation at Step S808 (Step S809), and the Check function is ended.

Given below is the explanation of the range information calculation operation performed at Step S602. In the range information calculation operation, the list S obtained in the list generation operation (Step S601) is divided into lists F each of which includes M number of elements, and a set (min r, max r) is calculated regarding the lower limit value min r and the maximum limit value max r of the indices of the leaf nodes of each partial tree included in each list F. Then, sets of the lists F, the lower limit values min r, and the upper limit values max r are output. In this example, the lists F are equivalent to the set information.

Regarding the i-th list F (wherein 1≤i≤N, N represents the number of divisions, and N=ceiling(|S|/M)), the lower limit value min r and the upper limit value max r are calculated in the following manner.

for the first list F, min r=0 for the i-th list F, min r=max r+1 of the (i−1)-th list F (where i>1)

for the i-th list F, max r=index of the rightmost leaf node of the last element (partial tree) of the i-th list F (where i<N)

for the N-th list F, max r=index of the rightmost leaf node of the partial tree T'

FIG. 15 is a diagram illustrating an example of the pseudo code for performing the generation operation according to the first modification example in the case of priority to the left side. In the modification example too, the input (Input I, T, R, M) and the output (Output O) are identical to FIG. 9. In FIG. 15, fragment(S) is equivalent to the range information calculation operation.

Second Modification Example

When a new communication device 200 (a leaf node) is added to a group, the generating unit 102 can again perform the generation operation by referring to the node IDs of the leaf nodes belonging to the concerned group after the new addition. Moreover, when a particular communication device 200 (a leaf node) withdraws from a group, the generating unit 102 can again perform the generation operation by referring to the node IDs of the leaf nodes belonging to concerned group after the deletion. As a result, dynamic group management can be achieved while ensuring scalability.

Second Embodiment

Given below is the explanation of a second embodiment.

As explained in the first embodiment, if the number of target members becomes enormously large, it is likely that the MKB for group operations becomes extremely large in size. Thus, if the MKB is distributed as it is in a communication network, it is likely that the communication load becomes extremely large.

In that regard, in the second embodiment, in order to reduce the network load, from an MKB including a plurality of indices and a plurality of cipher texts as elements, an MKB (an indexless MKB) is generated by eliminating the plurality of indices; and the generated MKB is sent. However, under the premise of the group control method described earlier, even if simply an indexless MKB is sent, there are times when the group control cannot be performed as intended. For example, a plurality of cipher texts included as elements in an indexless MKB are all generated using commonly used symmetric-key encryption. Besides, when a communication device receives an indexless MKB; even if that communication device attempts decryption of the cipher texts, which are included in the indexless MKB, using the device keys held therein, there is no way to determine whether or not a group key was correctly obtained. That is because of the following reason. When the key used in encryption is different than the key used in decryption, the decryption function in commonly used symmetric-key encryption returns an incorrect decryption result. However, there is no way to determine that the result is an incorrect decryption result. For that reason, the communication device cannot determine whether to perform operations to participate in the group or to perform operations to withdraw from the group.

In order to avoid this issue, the cipher texts to be included as elements in an indexless MKB are generated using authenticated encryption. Herein, authenticated encryption implies symmetric-key encryption having a function by which, when incorrect decryption is performed due to different keys used in encryption and decryption, it is identified that the decryption result is incorrect. Representative examples of authenticated encryption include AES-CCM and AES-GCM, and there are various known technologies available. For example, when an indexless MKB is received, a communication device uses each of a plurality of device keys held therein and attempts decryption of the cipher texts included in the indexless MKB. If the decryption of any one cipher text is successful and if the communication device is participating in the corresponding group, the communication device updates the information of the participating group using the derived group key. On the other hand, if the decryption of any one cipher text is successful but if the communication device is not participating in the corresponding group, then the communication device participates in the group using the derived group key. However, if all decryption operations end up in failure thereby leading to a failure in obtaining a group key and if the communication device is participating in a group, then the communication device withdraws from the group.

In this way, in the second embodiment, a communication device uses the device keys held therein to attempt decryption, and checks whether participation in a group is instructed or withdrawal from a group is instructed. As a result, intended group operations can be performed using an indexless MKB too.

Regarding a group management tree that is used in processing indexless MKBs according to the second embodiment, the structure is identical to the first embodiment.

An indexless MKB generated from the group management tree includes the following element, for example.

(AuthEnc(node key of node i, group key))

In the example of the group management tree illustrated in FIG. 1, an MKB having the following four elements is generated. The four elements respectively correspond to nodes 000, 010, 10, and 110. Herein, Kg represents a group key, and AuthEnc(k(000), Kg) represents, for example, data obtained by encrypting Kg according to authenticated encryption using k(000).

(000, AuthEnc(k(000), Kg), (010, AuthEnc(k(010), Kg), (10, AuthEnc(k(10), Kg), (110, AuthEnc(k(110), Kg)

The indexless MKBs corresponding to the abovementioned MKBs are as follows.

(AuthEnc(k(000), Kg), AuthEnc(k(010), Kg), AuthEnc(k(10), Kg), AuthEnc(k(110), Kg)

In the second embodiment, an MKB having the structure with eliminated indices is sent to a communication device via multicast communication and broadcast communication.

Given below is the detailed explanation of the second embodiment. A communication system according to the second embodiment includes a communication device 200-2 and a communication control device 100-2. Regarding the configuration of the communication system according to the second embodiment, except for the fact that the communication device 200-2 is used in place of the communication device 200 and that the communication control device 100-2 is used in place of the communication control device 100, the configuration is identical to the communication system illustrated in FIG. 2 according to the first embodiment. Hence, the same explanation is not repeated.

The communication control device 100-2 sends a group operation command to each communication device 200-2. A group operation command includes, for example, set information. Moreover, a group operation command may also include range information (for example, the range of device IDs) in an identical manner to the first embodiment. Furthermore, a group operation command may also include the group ID that enables identification of the post-updating group.

The set information represents information about a set of a predetermined number of partial trees (for example, the partial trees s illustrated in FIG. 1) that include only such leaf nodes (corresponding to the communication devices) which belong to a group. For example, the set information can contain an indexless MKB obtained by eliminating indices from an MKB from which the communication devices corresponding to the leaf nodes of the partial trees included in the set can derive the group key. In this way, in the second embodiment, instead of sending an MKB in entirety, an indexless MKB obtained from the MKB is sent to the communication devices 200-2 in a corresponding manner to the set information generated to include the partial tree s.

In an identical manner to the first embodiment, the set information can be configured as information about a set of a predetermined number of partial trees (for example, the partial trees s illustrated in FIG. 1) that include only such leaf nodes (corresponding to the communication devices) which belong to a group. Moreover, the range information indicates the range of indices assigned to the leaf nodes of each partial tree included in the set indicated by the set information. As described earlier, since an index is equivalent to the device ID of the corresponding communication device, the range information enables identification of the range of device IDs of the communication devices to be subjected to group operations. The details regarding the method of generating the set information and the range information are identical to the first embodiment. In the first embodiment, without setting node keys and device keys as well as without using MKBs, it is possible to determine whether or not to participate in a group. In the second embodiment, since an indexless MKB including node keys is used, a method in the first embodiment in which node keys and MKBs are used can be combined.

Figure 16:
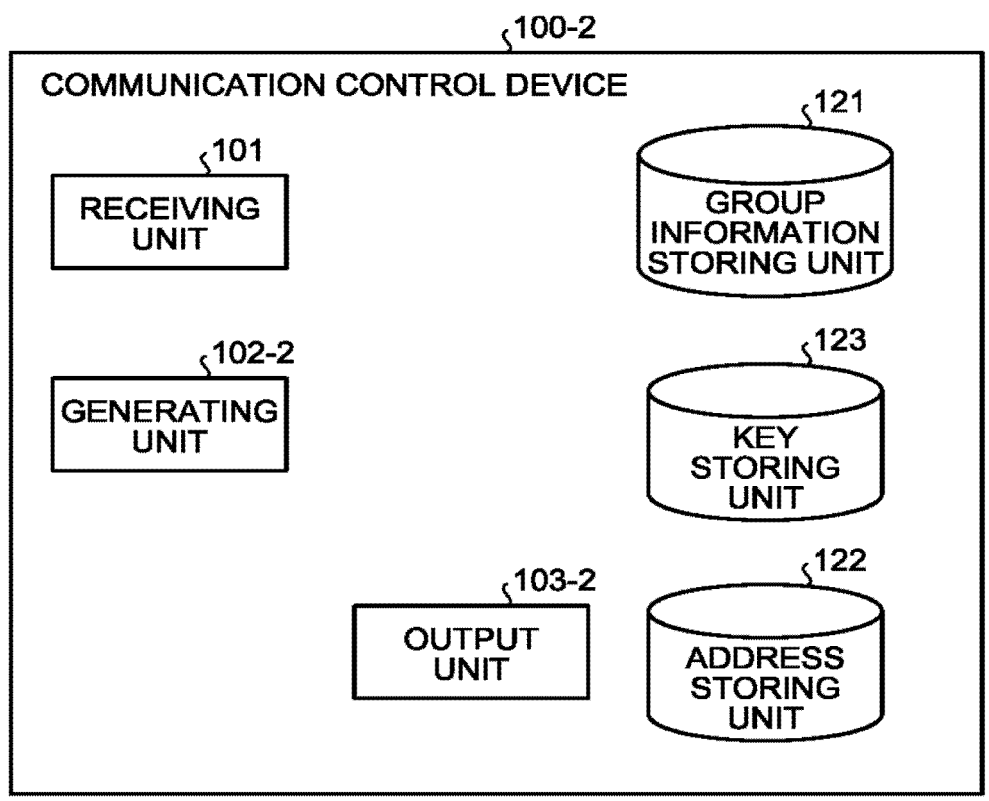
FIG. 16 is a block diagram of a communication control device according to a second embodiment.

FIG. 16 is a block diagram illustrating an exemplary configuration of the communication control device 100-2. As illustrated in FIG. 16, the communication control device 100-2 includes the group information storing unit 121, the address storing unit 122, the key storing unit 123, the receiving unit 101, a generating unit 102-2, and an output unit 103-2. In the second embodiment, the functions of the generating unit 102-2 and the output unit 103-2 are different than in the first embodiment. Apart from that, the configuration and the functions are identical to those explained with reference to FIG. 3 that is the block diagram of the communication control device 100 according to the first embodiment. Hence, the same reference numerals are used, and the same explanation is not repeated.

The generating unit 102-2 generates information to be used in group operations. For example, the generating unit 102-2 generates an indexless MKB explained earlier. Herein, the generating unit 102-2 generates an MKB by tracing a group management tree having the complete binary tree structure, and eliminates indices from that MKB. For example, the generating unit 102-2 performs, either from the leftmost leaf node toward the rightmost leaf node or from the rightmost leaf node toward the leftmost leaf node, a tracing operation that includes an operation of obtaining set information, which indicates a set of partial trees (partial trees of the group management tree) each including only the leaf nodes identified by node IDs. In the case of using the range information, in an identical manner to the first embodiment, the tracing operation may further include an operation of obtaining the range information of the indices of the leaf nodes included in the obtained set. Then, the generating unit 102-2 repeatedly performs an operation of encrypting the group key with the key (node key) associated to the root node of each partial tree, and generates an indexless MKB. As a result, the amount of calculation can be considered as O(L) (where L represents the number of leaf nodes). Meanwhile, indexless MKBs can be generated as MKBs not including indices while tracing the group management key; or MKBs including indices can be generated and then the indices can be eliminated from the MKBs to generate indexless MKBs. The details of the generation operation performed by the generating unit 102-2 are given later.

The output unit 103-2 outputs the set information at least to the communication devices 200-2 associated to the leaf nodes belonging to the group. As described earlier, the set information can also contain key information (indexless MKBs) that enables the communication devices 200-2, which are associated to the leaf nodes of the partial trees included in the set, to derive the group key. For example, as described earlier, an indexless MKB is expressed in the format of (AuthEnc(node key of node i, group key)).

For example, the output unit 103-2 sends, via multicasting, a group operation message including indexless MKBs to the multicast groups to which belong the communication devices 200-2 belonging to the group. In this way, the output of the output unit 103-2 is allowed to reach even those communication devices 200-2 which are not to be subjected to a group change. Hence, as compared to a case in which the output is not allowed to reach, it becomes possible to reduce the calculation cost required for the determination of the output destinations by the output unit 103-2.

Moreover, the output unit 103-2 can be configured to output the abovementioned information to such multicast group that include the communication devices 200-2 included in the pre-updating group but not included in the post-updating group. Although such communication devices 200-2 belong to the multicast group, they cannot derive the group key from the indexless MKB and hence withdraw from the post-updating group. In this way, a command for withdrawal from the group can be issued using indexless MKBs. As a result of issuing such a command, the communication devices 200-2 can appropriately manage the information which needs to be retained.

Alternatively, a command for withdrawal as described above need not be sent to the communication devices 200-2 that are not included in the post-updating group. That is because the communication devices 200-2 that are not included in the post-updating group cannot derive the post-updating group key in response to a command for updating, and hence cannot participate in the post-updating group. As a result of such a configuration, the number of commands that need to be issued by the communication control device 100-2 may be reduced.

The output unit 103-2 outputs the output information to such a set of communication devices 200-2 which represents the set (group) of the communication devices 200-2 managed independently of the target groups for group operations using MKBs and which includes at least all communication devices 200-2 subjected to group updating. Herein, a set of communication devices 200-2 implies a collection of a plurality of communication devices 200-2, and need not always match with the group assigned with a group ID. Examples of a set of communication devices 200-2 include a set of communication devices 200-2 that receive data via multicast communication; and a set of communication devices 200-2 that receive data via broadcast communication, that is, a set of all communication devices 200-2. For example, the output unit 103-2 can send the output information using one or more multicast communications or broadcast communications to a set of communication devices 200-2 that include a device ID list or to a group. In the case of sending the output information using multicast communication, the output unit 103-2 sends the output information to one or more addresses (multicast addresses) that, from among the addresses stored in the address storing unit 122, are associated to the target device IDs for distribution.

Figure 17:
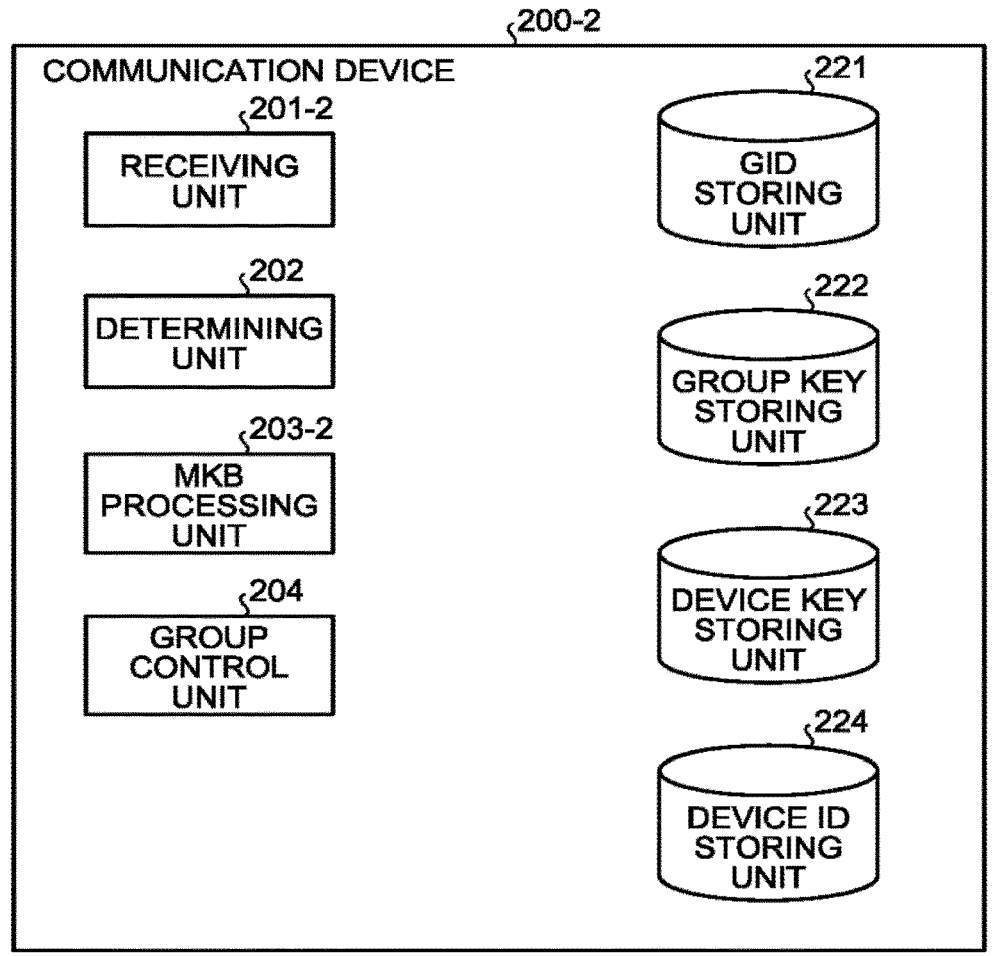
FIG. 17 is a block diagram of a communication device according to the second embodiment.

FIG. 17 is a block diagram illustrating an exemplary configuration of the communication device 200-2. As illustrated in FIG. 17, the communication device 200-2 includes the GID storing unit 221, the group key storing unit 222, the device key storing unit 223, the device ID storing unit 224, a receiving unit 201-2, the determining unit 202, an MKB processing unit 203-2, and the group control unit 204. In the case of not using MKBs, the group key storing unit 222 and the device key storing unit 223 need not be disposed. In the second embodiment, the functions of the receiving unit 201-2 and the MKB processing unit 203-2 are different than in the first embodiment. Apart from that, the configuration and the functions are identical to those explained with reference to FIG. 4 that is the block diagram of the communication device 200 according to the first embodiment. Hence, the same reference numerals are used, and the same explanation is not repeated.

The receiving unit 201-2 receives a variety of information from external devices such as the communication control device 100-2 and the other communication devices 200-2. For example, the receiving unit 201-2 receives a group operation message from the communication control device 100-2. Moreover, the receiving unit 201-2 receives output information via multicast communication or broadcast communication, for example. Then, the receiving unit 201-2 determines whether or not the received message is a group operation message. If the received message is not a group operation message, the message is sent to another module (not illustrated) that needs to process the message. When the received message is a group operation message, the data of the message is sent to the MKB processing unit 203-2.

The MKB processing unit 203-2 performs indexless MKB processing in which the group key is generated from the set information (indexless MKBs) included in the group operation message and from the device keys stored in the device key storing unit 223.

For example, as described above, when an indexless MKB is expressed as (AuthEnc(node key of node i, group key)), the MKB processing unit 203-2 performs AuthDec (node key of node j, AuthEnc(node key of node i, group key)) using the key of each node as recorded in the device key storing unit 223 and, in the case of successful decryption, sets the result as the group key. Herein, j represents the index assigned to the device key recorded in the device key storing unit 223. Moreover, AuthDec(node key of node j, AuthEnc(node key of node i, group key)) represents the result of decrypting the cipher text AuthEnc(node key of node i, group key) using the node key assigned to the node j. When the node key of the node j is identical to the node key of the node i, the decryption result serves as the group key. Otherwise, the decryption result represents an error.

If the group key can be obtained as a result of the indexless MKB processing, it implies that the concerned communication device 200-2 belongs to the group identified by the GID. Then, the MKB processing unit 203-2 sends the GID and the obtained group key to the group control unit 204.

On the other hand, if the group key cannot be obtained as a result of the indexless MKB processing, it implies that the concerned communication device 200-2 does not belong to the group identified by the GID. Thus, in case the communication device 200-2 is belonging to the group, it needs to withdraw from the group. For that reason, the MKB processing unit 203-2 sends the GID and a notification about the failure to obtain the group key to the group control unit 204.

Meanwhile, each of the abovementioned storing units can be configured using any type of commonly used memory medium such as an HDD, an optical disk, a memory card, or a RAM.

Moreover, the receiving unit 101, the generating unit 102-2, and the output unit 103-2 of the communication control device 100-2; as well as the receiving unit 201, the determining unit 202, the MKB processing unit 203-2, and the group control unit 204 of the communication device 200-2 can be implemented, for example, by making one or more processors such as a CPU to execute programs, that is, can be implemented using software; or can be implemented using hardware such as one or more Integrated Circuits (IC); or can be implemented using a combination of software and hardware.

Figure 18:
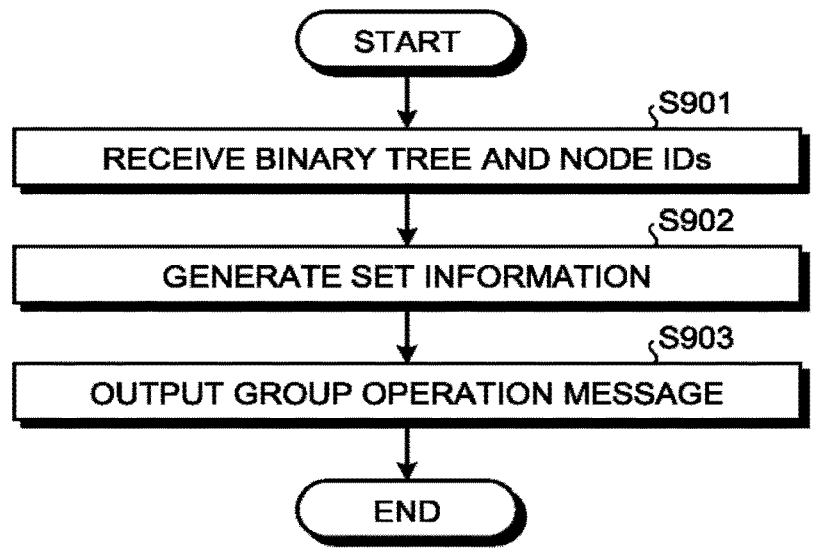
FIG. 18 is a flowchart for explaining a communication control operation according to the second embodiment.

Explained below with reference to FIG. 18 is a communication control operation performed by the communication control device 100-2 according to the second embodiment. FIG. 18 is a flowchart for explaining an example of the communication control operation according to the second embodiment.

The receiving unit 101 receives the complete binary tree T (or the partial tree T' of the complete binary tree T), and receives the node IDs of the leaf nodes corresponding to the communication devices 200-2 belonging to a group (Step S901). Alternatively, the device IDs of the communication devices 200-2 belonging to the group can be received, and the node IDs of the leaf nodes corresponding to the communication devices 200-2 having the received device IDs can be obtained. Then, based on the complete binary tree T (or the partial tree T') and the node IDs, the generating unit 102-2 performs a generation operation for generating set information and range information (Step S902). Subsequently, the generating unit 102-2 generates a group operation message that includes the set information and the range information. The output unit 103-2 outputs the group operation message (Step S903).

Given below are the details of the generation operation performed at Step S902. In an algorithm identical to that in Step S102 according to the first embodiment, the following information is used as input.

I: a list of device IDs of the communication devices 200-2 included as group members T': the partial tree of the complete binary T which represents the entire tree (the root node of T' is R)

M: the number of nodes of the partial tree T'

Moreover, in the generation operation, the list O of (S, min r, max r) is output.

S: the list of nodes included in the MKB min r: the lower limit value of the node indices of the leaf nodes with respect to the list S max r: the upper limit value of the node indices of the leaf nodes with respect to the list S Meanwhile, min r and max r are equivalent to the range information.

In order to generate an indexless MKB to be included in the set information, for example, AuthEnc(node key of node i, group key) can be calculated for each node included in the list S and the result can be output. Herein, i represents the index of each node included in the list S.

As described above, according to the second embodiment, the indices of MKBs can be deleted from the set information. As a result, for example, as compared to the method of sending entire MKBs, the information that needs to be sent can be reduced in volume.

Figure 19:
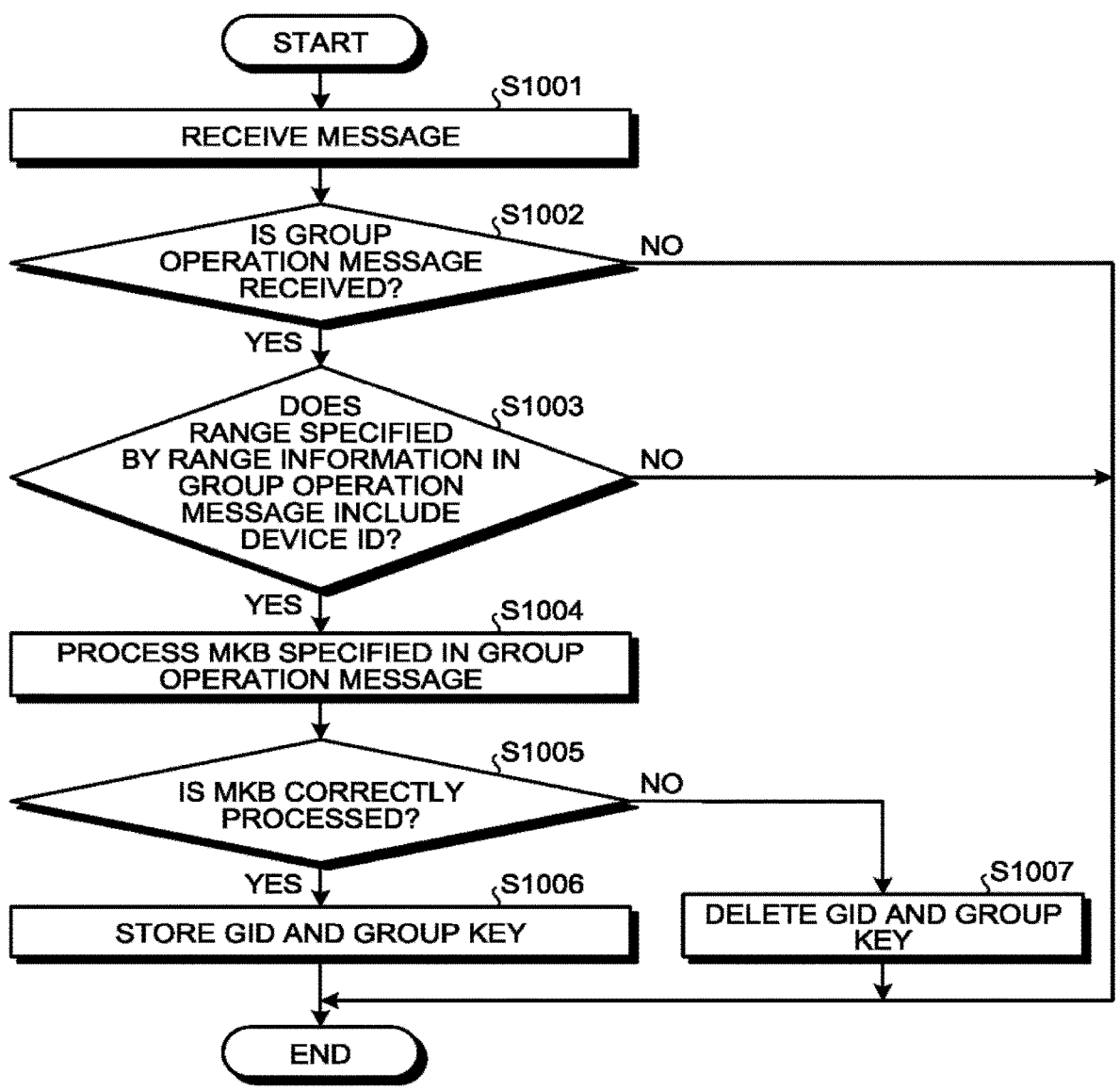
FIG. 19 is a flowchart for explaining a group control operation according to the second embodiment.

Explained below with reference to FIG. 19 is a group control operation performed by the communication device 200-2 according to the second embodiment. FIG. 19 is a flowchart for explaining an example of the group control operation according to the second embodiment.

The receiving unit 201-2 receives a message from an external device such as the communication control device 100-2 (Step S1001). The receiving unit 201-2 determines whether or not the received message is a group operation message (Step S1002). If the received message is not a group operation message (No at Step S1002), then it marks the end of the group control operation. As described earlier, any message other than a group operation message is sent to the module that needs to process the message, so that the message is appropriately processed.

When the received message is a group operation message (Yes at Step S1002), the determining unit 202 determines whether or not the range specified by the range information in the group operation message includes the device ID stored in the device ID storing unit 224 (Step S1003).

If the range specified by the range information does not include the device ID (No at Step S1003), then the concerned communication device 200-2 is not the target device for group operation, and it marks the end of the group control operation. When the range specified by the range information includes the device ID (Yes at Step S1003), the MKB processing unit 203-2 processes the indexless MKB specified in the group operation message (Step S1004).

The MKB processing unit 203-2 determines whether or not the indexless MKB is correctly processed (Step S1005). If the indexless MKB is correctly processed (Yes at Step S1005), then the group control unit 204 stores the GID, which is specified in the group operation message, in the GID storing unit 221 and stores the group key, which is obtained as a result of the indexless MKB processing, in the group key storing unit 222 (Step S1006). However, when the indexless MKB is not correctly processed (No at Step S1005), the group control unit 204 deletes the GID, which is specified in the group operation message, from the GID storing unit 221 and deletes the group key from the group key storing unit 222 (Step S1007).

In this way, in the communication control device according to the second embodiment, dynamic group management can be achieved while ensuring scalability. Moreover, for the purpose of performing group management, instead of sending an entire MKB, an indexless MKB is sent. That enables achieving reduction in the communication load.

Third Modification Example

In the second embodiment, if division of MKBs is not to be done, the range information can be eliminated from group operation messages. As a result of such a configuration, the communication load can be further reduced.

Fourth Modification Example

When a new communication device 200-2 (leaf node) is added to a group, the generating unit 102-2 can again perform the generation operation using the node ID of the leaf IDs belonging to the post-addition group. Moreover, when a communication device 200-2 (leaf node) withdraws from the group, the generating unit 102-2 can again perform the generation operation using the node IDs of the leaf node belonging to the post-deletion group. As a result, dynamic group management can be achieved while ensuring scalability.

Third Embodiment

Given below is the explanation of a third embodiment.

As explained in the first embodiment, if the number of target members becomes enormously large, it is likely that the MKB for group operations becomes extremely large in size. Thus, if the MKB is distributed as it is in a communication network, it is likely that the communication load becomes extremely large.

In that regard, in the third embodiment, in order to reduce the network load, from an MKB including a plurality of indices and a plurality of cipher texts as elements, a plurality of indices is eliminated and a Bloom filter of a plurality of indices is alternatively included to generate a Bloom filter MKB; and the Bloom filter MKB is sent. However, under the premise of the group control method described earlier, even if a Bloom filter MKB is sent, there are times when the group control cannot be performed as intended. For example, a plurality of cipher texts included as elements in an MKB are all generated using commonly used symmetric-key encryption. Besides, when a communication device receives a Bloom filter MKB, even if that communication device attempts decryption of the cipher texts, which are included in the Bloom filter MKB, using the device key held therein in a corresponding manner to the indices detected in the Bloom filter, the group key cannot be always correctly obtained. That is because of the following reason. When the key used in encryption is different than the key used in decryption, the decryption function in commonly used symmetric-key encryption returns an incorrect decryption result. However, there is no way to determine that the result is an incorrect decryption result. Hence, if erroneous indices are detected due to false positives in the Bloom filter, then the concerned communication device happens to perform either an operation to participate in a group not intended by the communication control device or an operation to withdraw from a group not intended by the communication control device.

In order to avoid this issue, the cipher texts included as elements in a Bloom filter MKB are generated using authenticated encryption. Herein, authenticated encryption implies symmetric-key encryption having a function by which, when incorrect decryption is performed due to different keys used in encryption and decryption, it is identified that the decryption result is incorrect. Representative examples of authenticated encryption include AES-CCM and AES-GCM, and there are various known technologies available. For example, when a Bloom filter MKB is received, a communication device uses each of a plurality of device keys held therein as detected in the Bloom filter, and attempts decryption of the cipher texts included in the Bloom filter MKB. If the decryption of any one cipher text is successful and if the communication device is participating in the corresponding group, the communication device updates the information of the participating group using the derived group key. On the other hand, if the decryption of any one cipher text is successful but if the communication device is not participating in the corresponding group, then the communication device participates in the group using the derived group key. However, if all decryption operations end up in failure thereby leading to a failure in obtaining a group key and if the communication device is participating in a group, then the communication device withdraws from the group.

In this way, in the third embodiment, a communication device uses the device keys held therein as detected in a Bloom filter to attempt decryption, and checks whether participation in a group is instructed or withdrawal from a group is instructed. As a result, intended group operations can be performed using a Bloom filter MKB too.

Regarding a group management tree that is used in processing Bloom filter MKBs according to the third embodiment, the structure is identical to the first embodiment.

Moreover, in an identical manner to the first embodiment, each communication device has a unique device ID in the target system, and each leaf node of the complete binary tree T corresponds to one of the communication devices.

A Bloom filter MKB generated from the group management tree includes the following element, for example.

(Bloom filter of index of node i, AuthEnc(node key of node i, group key))

In the example of the group management tree illustrated in FIG. 1, an MKB including the following four elements is generated. The four elements respectively correspond to nodes 000, 010, 10, and 110. Herein, Kg represents a group key, and AuthEnc(k(000), Kg) represents, for example, data obtained by encrypting Kg using k(000).

(000, AuthEnc(k(000), Kg), (010, AuthEnc(k(010), Kg), (10, AuthEnc(k(10), Kg), (110, AuthEnc(k(110), Kg)

The Bloom filter MKBs corresponding to the abovementioned MKBs are as follows.

(Bloom filter generated from (000, 010, 10, 110), (AuthEnc(k(000), Kg), AuthEnc(k(010), Kg), AuthEnc(k(10), Kg), AuthEnc(k(110), Kg)

In the third embodiment, an MKB having the structure with a Bloom filter of indices instead of including indices is sent to a communication device via multicast communication and broadcast communication.

Given below is the detailed explanation of the third embodiment. A communication system according to the third embodiment includes a communication device 200-3 and a communication control device 100-3. Regarding the configuration of the communication system according to the third embodiment, except for the fact that the communication device 200-3 is used in place of the communication device 200 and that the communication control device 100-3 is used in place of the communication control device 100, the configuration is identical to the communication system illustrated in FIG. 2 according to the first embodiment. Hence, the same explanation is not repeated.

The communication control device 100-3 sends a group operation command to each communication device 200-3. A group operation command includes, for example, set information. Moreover, a group operation command may also include range information (for example, the range of device IDs) in an identical manner to the first embodiment. Furthermore, a group operation command may also include the group ID that enables identification of the post-updating group.

The set information represents information about a set of a predetermined number of partial trees (for example, the partial trees s illustrated in FIG. 1) that include only such leaf nodes (corresponding to the communication devices) which belong to a group. For example, the set information can contain a Bloom filter MKB obtained by eliminating indices from an MKB from which the communication devices corresponding to the leaf nodes of the partial trees included in the set can derive the group key, and then by attaching a Bloom filter of those indices. In this way, in the third embodiment, instead of sending an MKB in entirety, a Bloom filter MKB corresponding to the set information generated to include the partial trees s is sent to the communication devices 200-3.

In an identical manner to the first embodiment, the set information can be configured as information about a set of a predetermined number of partial trees (for example, the partial trees s illustrated in FIG. 1) that include only such leaf nodes (corresponding to the communication devices) which belong to a group. Moreover, the range information indicates the range of indices assigned to the leaf nodes of each partial tree included in the set indicated by the set information. As described earlier, since an index is equivalent to the device ID of the corresponding communication device, the range information enables identification of the range of device IDs of the communication devices to be subjected to group operations. The details regarding the method of generating the set information and the range information are identical to the first embodiment. In the first embodiment, without setting node keys and device keys as well as without using MKBs, it is possible to determine whether or not to participate in a group. In the third embodiment, since a Bloom filter MKB including node keys is used, a method in the first embodiment in which node keys and MKBs are used can be combined.

Figure 20:
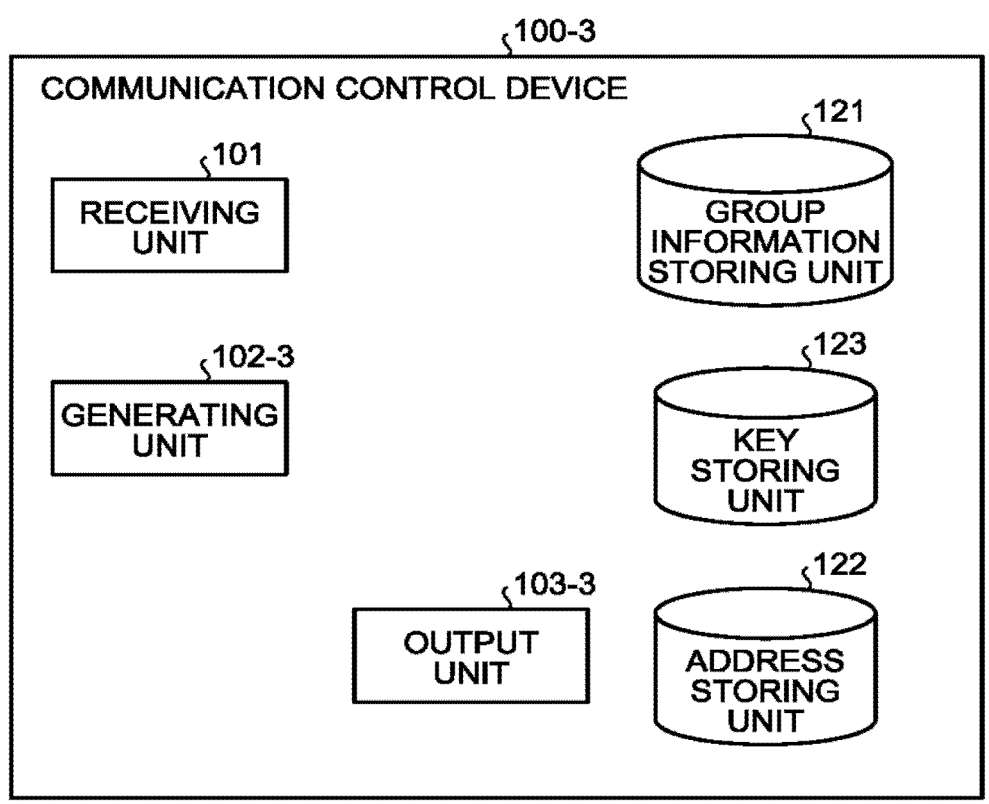
FIG. 20 is a block diagram of a communication control device according to a third embodiment.

FIG. 20 is a block diagram illustrating an exemplary configuration of the communication control device 100-3. As illustrated in FIG. 20, the communication control device 100-3 includes the group information storing unit 121, the address storing unit 122, the key storing unit 123, the receiving unit 101, a generating unit 102-3, and an output unit 103-3. In the third embodiment, the functions of the generating unit 102-3 and the output unit 103-3 are different than in the first embodiment. Apart from that, the configuration and the functions are identical to those explained with reference to FIG. 3 that is the block diagram of the communication control device 100 according to the first embodiment. Hence, the same reference numerals are used, and the same explanation is not repeated.

The generating unit 102-3 generates information to be used in group operations. For example, the generating unit 102-3 generates a Bloom filter MKB explained earlier. Herein, the generating unit 102-3 generates an MKB by tracing a group management tree having the complete binary tree structure; derives a bloom filter from the indices attached to that MKB; and eliminates indices from that MKB before attaching the bloom filter. For example, the generating unit 102-2 performs, either from the leftmost leaf node toward the rightmost leaf node or from the rightmost leaf node toward the leftmost leaf node, a tracing operation that includes an operation of obtaining set information, which indicates a set of partial trees (partial trees of the group management tree) each including only the leaf nodes identified by node IDs. In the case of using the range information, in an identical manner to the first embodiment, the tracing operation may further include an operation of obtaining the range information of the indices of the leaf nodes included in the obtained set. Then, the generating unit 102-3 repeatedly performs an operation of encrypting the group key with the key (node key) associated to the root node of each partial tree and an operation of deriving a Bloom filter from the index of the root node of each partial tree, and generates a Bloom filter MKB. As a result, the amount of calculation can be considered as O(L) (where L represents the number of leaf nodes). The details of the generation operation performed by the generating unit 102-3 are given later.

The output unit 103-3 outputs the set information at least to the communication devices 200-3 associated to the leaf nodes belonging to the group. As described earlier, the set information can also contain key information (Bloom filter MKBs) that enables the communication devices 200-3, which are associated to the leaf nodes of the partial trees included in the set, to derive the group key. For example, as described earlier, a Bloom filter MKB is expressed in the format of (Bloom filter of indices, list of AuthEnc(node key of node i, group key)).

For example, the output unit 103-3 sends, via multicasting, a group operation message including a Bloom filter MKB to the multicast groups to which belong the communication devices 200-3 belonging to the group. In this way, the output of the output unit 103-3 is allowed to reach even those communication devices 200-3 which are not to be subjected to a group change. Hence, as compared to a case in which the output is not allowed to reach, it becomes possible to reduce the calculation cost required for the determination of the output destinations by the output unit 103-3.

Moreover, the output unit 103-3 can be configured to output the abovementioned information to such multicast group that include the communication devices 200-3 included in the pre-updating group but not included in the post-updating group. Although such communication devices 200-3 belong to the multicast group, they cannot derive the group key from the Bloom filter MKB and hence withdraw from the post-updating group. In this way, a command for withdrawal from the group can be issued using a Bloom filter MKB. As a result of issuing such a command, the communication devices 200-3 can appropriately manage the information which needs to be retained.

Alternatively, a command for withdrawal as described above need not be sent to the communication devices 200-3 that are not included in the post-updating group. That is because the communication devices 200-3 that are not included in the post-updating group cannot derive the post-updating group key in response to a command for updating, and hence cannot participate in the post-updating group. As a result of such a configuration, the number of commands that need to be issued by the communication control device 100-3 may be reduced.

The output unit 103-3 outputs the output information to such a set of communication devices 200-3 which represents the set (group) of the communication devices 200-3 managed independently of the target groups for group operations using Bloom filter MKBs and which includes at least all communication devices 200-3 subjected to group updating. Herein, a set of communication devices 200-3 implies a collection of a plurality of communication devices 200-3, and need not always match with the group assigned with a group ID. Examples of a set of communication devices 200-3 include a set of communication devices 200-3 that receive data via multicast communication; and a set of communication devices 200-3 that receive data via broadcast communication, that is, a set of all communication devices 200-3. For example, the output unit 103-3 can send the output information using one or more multicast communications or broadcast communications to a set of communication devices 200-3 that include a device ID list or to a group. In the case of sending the output information using multicast communication, the output unit 103-3 sends the output information to one or more addresses (multicast addresses) that, from among the addresses stored in the address storing unit 122, are associated to the target device IDs for distribution.

Figure 21:
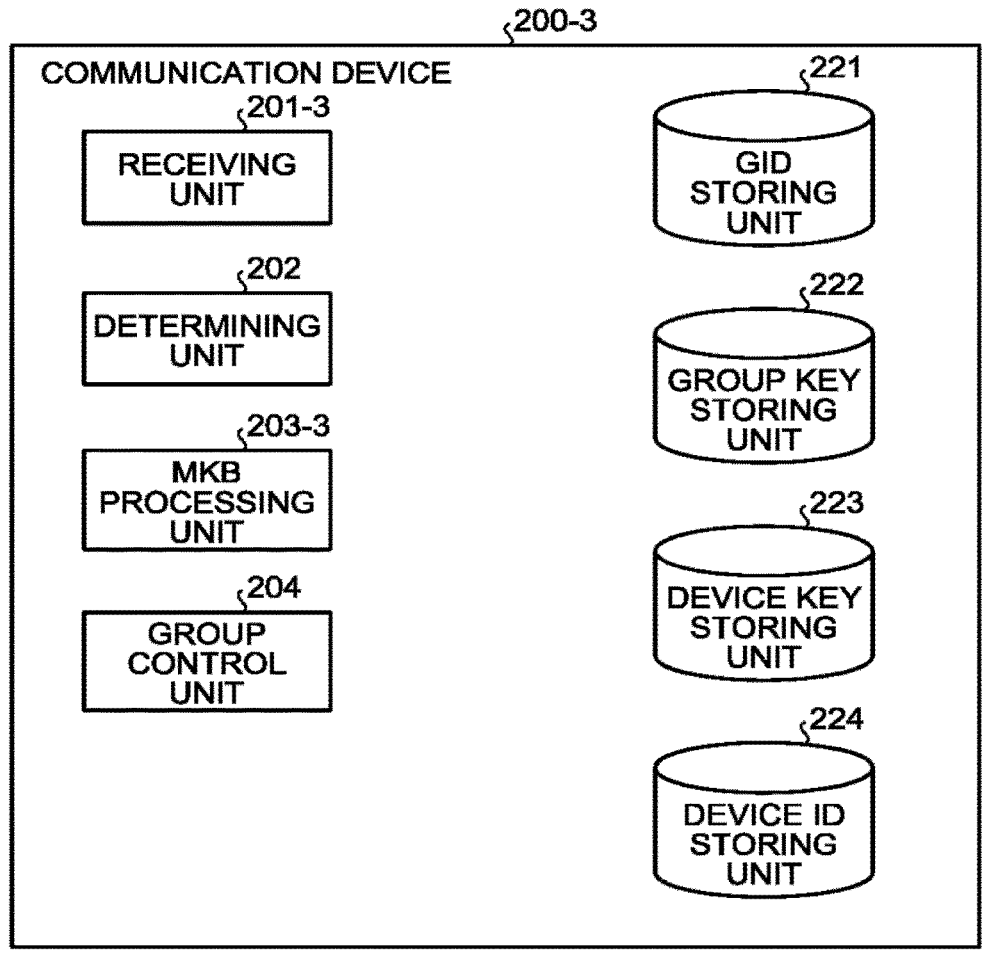
FIG. 21 is a block diagram of a communication device according to the third embodiment.

FIG. 21 is a block diagram illustrating an exemplary configuration of the communication device 200-3. As illustrated in FIG. 21, the communication device 200-3 includes the GID storing unit 221, the group key storing unit 222, the device key storing unit 223, the device ID storing unit 224, a receiving unit 201-3, the determining unit 202, an MKB processing unit 203-3, and the group control unit 204. In the case of not using Bloom filter MKBs, the group key storing unit 222 and the device key storing unit 223 need not be disposed. In the third embodiment, the functions of the receiving unit 201-3 and the MKB processing unit 203-3 are different than in the first embodiment. Apart from that, the configuration and the functions are identical to those explained with reference to FIG. 4 that is the block diagram of the communication device 200 according to the first embodiment. Hence, the same reference numerals are used, and the same explanation is not repeated.

The receiving unit 201-3 receives a variety of information from external devices such as the communication control device 100-3 and the other communication devices 200-3. For example, the receiving unit 201-3 receives a group operation message from the communication control device 100-3. Moreover, the receiving unit 201-3 receives output information via multicast communication or broadcast communication, for example. Then, the receiving unit 201-3 determines whether or not the received message is a group operation message. If the received message is not a group operation message, the message is sent to another module (not illustrated) that needs to process the message. When the received message is a group operation message, the data of the message is sent to the MKB processing unit 203-3.

The MKB processing unit 203-3 performs Bloom filter MKB processing in which the group key is generated from the set information (Bloom filter MKBs) included in the group operation message and from the device key stored in the device key storing unit 223.

For example, as described above, when a Bloom filter MKB is expressed as (Bloom filter, list of AuthEnc(node key of node i, group key)), the MKB processing unit 203-3 examines the index of each node, which is recorded in the device key storing unit 223, using the Bloom filter, and searches for the detected index. If the index is detected, then the MKB processing unit 203-3 performs AuthDec(detected node key, AuthEnc(node key of node i, group key)) using the node key identified by the detected index and, in the case of successful decryption, sets the result as the group key. Herein, AuthDec(detected node key, AuthEnc(node key of node i, group key)) represents the result of decrypting the cipher text AuthEnc(node key of node i, group key) using the detected node key. When the node key of the detected node is identical to the node key of the node i, the decryption result serves as the group key. Otherwise, the decryption result represents an error.

If the group key can be obtained as a result of the Bloom filter MKB processing, it implies that the concerned communication device 200-3 belongs to the group identified by the GID. Then, the MKB processing unit 203-3 sends the GID and the obtained group key to the group control unit 204.

On the other hand, if the group key cannot be obtained as a result of the Bloom filter MKB processing, it implies that the concerned communication device 200-3 does not belong to the group identified by the GID. Thus, in case the communication device 200-3 is belonging to the group, it needs to withdraw from the group. For that reason, the MKB processing unit 203-3 sends the GID and a notification about the failure to obtain the group key to the group control unit 204.

Meanwhile, each of the abovementioned storing units can be configured using any type of commonly used memory medium such as an HDD, an optical disk, a memory card, or a RAM.

Moreover, the receiving unit 101, the generating unit 102-3, and the output unit 103-3 of the communication control device 100-3; as well as the receiving unit 201-3, the MKB processing unit 203-3, and the group control unit 204 of the communication device 200-3 can be implemented, for example, by making one or more processors such as a CPU to execute programs, that is, can be implemented using software; or can be implemented using hardware such as one or more Integrated Circuits (IC); or can be implemented using a combination of software and hardware.

Figure 22:
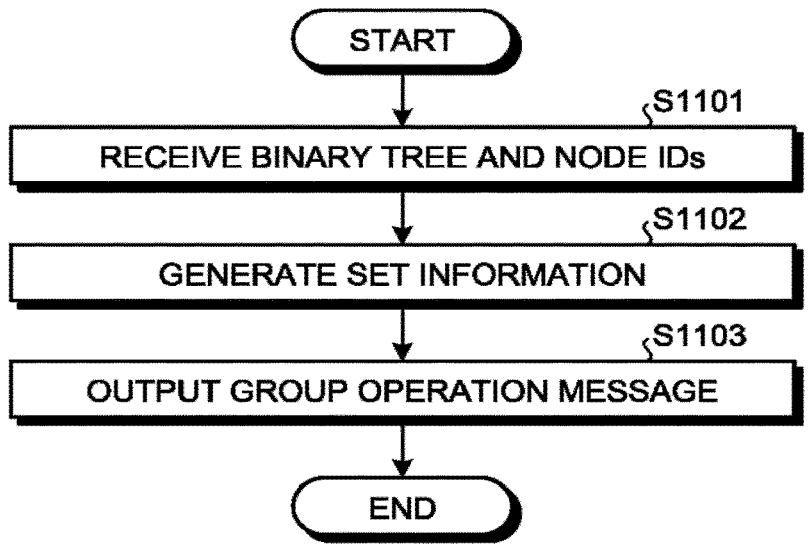
FIG. 22 is a flowchart for explaining a communication control operation according to the third embodiment.
Figure 23:
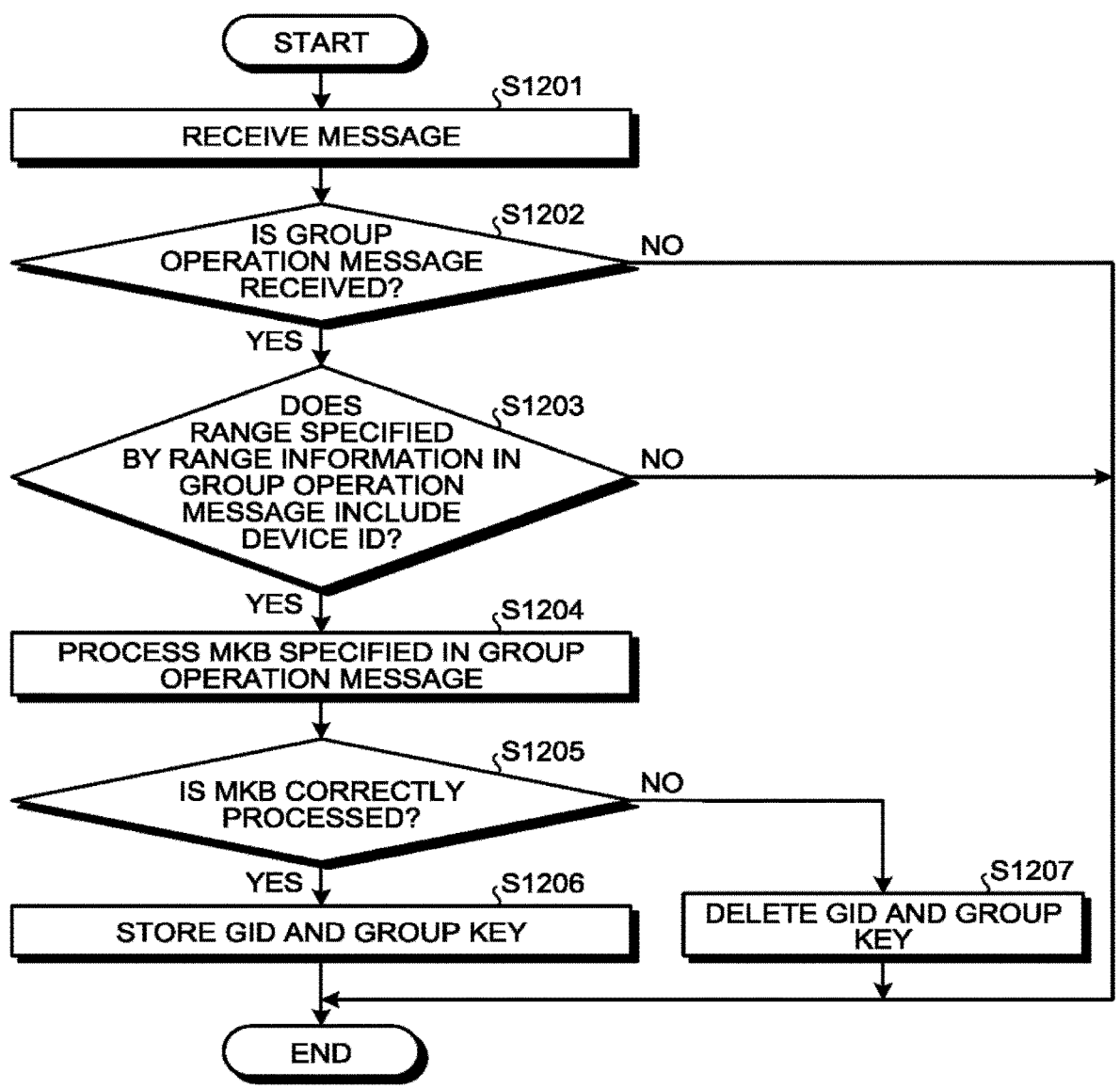
FIG. 23 is a flowchart for explaining a group control operation according to the third embodiment.

Explained below with reference to FIG. 22 is a communication control operation performed by the communication control device 100-3 according to the third embodiment. FIG. 22 is a flowchart for explaining an example of the communication control operation according to the third embodiment.

The receiving unit 101 receives the complete binary tree T (or the partial tree T' of the complete binary tree T), and receives the node IDs of the leaf nodes corresponding to the communication devices 200-3 belonging to a group (Step S1101). Alternatively, the device IDs of the communication devices 200-3 belonging to the group can be received, and the node IDs of the leaf nodes corresponding to the communication devices 200-3 having the received device IDs can be obtained. Then, based on the complete binary tree T (or the partial tree T') and the node IDs, the generating unit 102-3 performs a generation operation for generating set information and range information (Step S1102). Subsequently, the generating unit 102-3 generates a group operation message that includes the set information and the range information. The output unit 103-3 outputs the group operation message (Step S1103).

Given below are the details of the generation operation performed at Step S1102. In an algorithm identical to that in Step S102 according to the first embodiment, the following information is used as input.
I: a list of device IDs of the communication devices 200-3 included as group members
T': the partial tree of the complete binary T which represents the entire tree (the root node of T' is R)
M: the number of nodes of the partial tree T'

Moreover, in the generation operation, the list O of (S, min r, max r) is output.
S: the list of nodes included in the Bloom filter MKB
min r: the lower limit value of the node indices of the leaf nodes with respect to the list S
max r: the upper limit value of the node indices of the leaf nodes with respect to the list S Meanwhile, min r and max r are equivalent to the range information.

In order to generate a Bloom filter MKB to be included in the set information, for example, a Bloom filter can be calculated from the index of each node included in the list S; AuthEnc(node key of node i, group key) can be calculated for each node included in the list S; and the result can be output. Herein, i represents the index of each node included in the list S.

As described above, according to the third embodiment, the indices of an MKB can be deleted from the set information and a Bloom filter of the indices can be added in the set information. As a result, for example, as compared to the method of sending an entire MKB, the information that needs to be sent can be reduced in volume.

Explained below with reference to FIG. 22 is a group control operation performed by the communication device 200-3 according to the third embodiment. FIG. 22 is a flowchart for explaining an example of the group control operation according to the third embodiment.

The receiving unit 201-3 receives a message from an external device such as the communication control device 100-3 (Step S1201). The receiving unit 201-3 determines whether or not the received message is a group operation message (Step S1202). If the received message is not a group operation message (No at Step S1202), then it marks the end of the group control operation. As described earlier, any message other than a group operation message is sent to the module that needs to process the message, so that the message is appropriately processed.

When the received message is a group operation message (Yes at Step S1202), the determining unit 202 determines whether or not the range specified by the range information in the group operation message includes the device ID stored in the device ID storing unit 224 (Step S1203).

If the range specified by the range information does not include the device ID (No at Step S1203), then the concerned communication device 200-3 is not the target device for group operation, and it marks the end of the group control operation. When the range specified by the range information includes the device ID (Yes at Step S1203), the MKB processing unit 203-3 processes the Bloom-filter-attached MKB specified in the group operation message (Step S1204).

The MKB processing unit 203-3 determines whether or not the Bloom-filter-attached MKB is correctly processed (Step S1205). If the Bloom-filter-attached MKB is correctly processed (Yes at Step S1205), then the group control unit 204 stores the GID, which is specified in the group operation message, in the GID storing unit 221 and stores the group key, which is obtained as a result of the Bloom-filter-attached MKB processing, in the group key storing unit 222 (Step S1206). However, when the Bloom-filter-attached MKB is not correctly processed (No at Step S1205), the group control unit 204 deletes the GID, which is specified in the group operation message, from the GID storing unit 221 and deletes the group key from the group key storing unit 222 (Step S1207).

In this way, in the communication control device according to the third embodiment, dynamic group management can be achieved while ensuring scalability. Moreover, for the purpose of performing group management, instead of sending an entire MKB, a Bloom filter MKB is sent. That enables achieving reduction in the communication load.

Fifth Modification Example

In the third embodiment, if division of MKBs is not to be done, the range information can be eliminated from group operation messages. As a result of such a configuration, the communication load can be further reduced.

Sixth Embodiment

Regarding a Bloom filter included in the set information, the configuration can be such that the Bloom filter is calculated from the node keys identified by all node indices included in the list S.

For example, instead of using the indices of an MKB, the generating unit 102-3 generates a Bloom filter from the node keys identified by the indices and generates a Bloom filter MKB to which the Bloom filter is attached.

As described earlier, when a Bloom filter MKB is expressed in the format of (Bloom filter, list of AuthEnc (node key of node i, group key)), the MKB processing unit 203-3 examines the index of each node, which is recorded in the device key storing unit 223, using the Bloom filter, and searches for the detected node key. If the detected node key is found, then the MKB processing unit 203-3 performs AuthDec(detected node key, AuthEnc(node key of node i, group key)) and, in the case of successful decryption, sets the result as the group key.

As a result of such a configuration, a communication device not holding the node key can no more identify the devices instructed to participate in the group. Hence, group operations can be performed while ensuring privacy protection.

Seventh Modification Example

When a new communication device 200-3 (a leaf node) is added to a group, the generating unit 102-3 can again perform the generation operation by referring to the node IDs of the leaf nodes belonging to the concerned group after the new addition. Moreover, when a particular communication device 200-3 (a leaf node) withdraws from a group, the generating unit 102-3 can again perform the generation operation by referring to the node IDs of the leaf nodes belonging to concerned group after the deletion. As a result, dynamic group management can be achieved while ensuring scalability.

Figure 24:
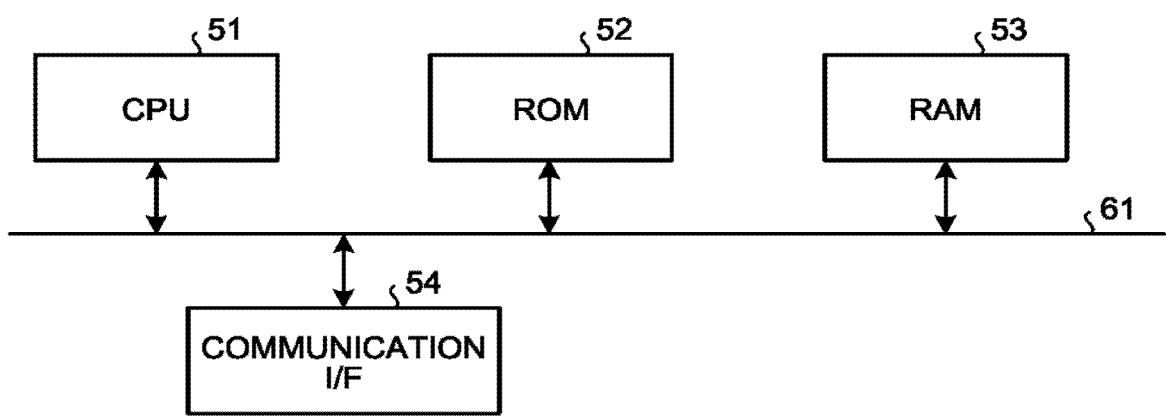
FIG. 24 is a hardware configuration diagram of the communication control device according to the embodiments.

Explained below with reference to FIG. 24 is a hardware configuration of the communication control device according to the embodiments. FIG. 24 is an explanatory diagram for explaining a hardware configuration of the communication control device according to the embodiments.

The communication control device according to the embodiments includes a control device such as a CPU 51; memory devices such as a Read Only Memory (ROM) 52 and a RAM 53; a communication I/F 54 that establishes connection with a network and performs communication; and a bus 61 that connects the constituent elements to each other.

The computer programs executed in the devices (the communication control device and the communication devices) according to the embodiments are stored in advance in the ROM 52.

Alternatively, the computer programs executed in the devices according to the embodiments can be recorded as installable or executable files in a computer-readable recording medium such as a Compact Disk Read Only Memory (CD-ROM), a flexible disk (FD), a Compact Disk Recordable (CD-R), or a Digital Versatile Disk (DVD); and can be provided as a computer program product.

Still alternatively, the computer programs executed in the devices according to the embodiments can be stored in a downloadable manner in a computer that is connected to a network such as the Internet. Still alternatively, the computer programs executed in the devices according to the embodiments can be distributed over a network such as the Internet.

The computer programs executed in the devices according to the embodiments can make a computer to function as the constituent elements described above. In the computer, the CPU 51 can read the computer programs from a computer-readable memory medium into a main memory device, and execute the computer programs.

While certain embodiments of the invention have been described, the embodiments have been presented by way of example only, and are not intended to limit the range of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the range and spirit of the inventions.

What is claimed is:

1. A communication control device comprising:
one or more processors that
receive input of a binary tree in which each leaf node has an index and a node key assigned thereto, and
receive input of node IDs that, from among leaf nodes, enable identification of leaf nodes belonging to a group;
generate a cipher text by encrypting a group key shared in the group using the node key assigned to a root node of a partial tree of the binary tree, the partial tree including only the leaf nodes identified by the node IDs, and
generate set information containing the generated cipher text, the set information indicating a set of a predetermined number of partial trees of the binary tree, each of the partial trees including only the leaf nodes identified by the node IDs;
generate range information indicating a lower limit value and an upper limit value of indices assigned to a plurality of leaf nodes of the predetermined number of partial trees included in the set; and
output the set information and the range information at least to a communication device associated to a leaf node belonging to the group,
wherein, when a leaf node is added to the group, the one or more processors regenerate the set information and the range information by referring to the node IDs of leaf nodes belonging to the group to which a leaf node has been added.

2. The communication control device according to claim 1, wherein the set information contains a Bloom filter for identifying the node key assigned to the root node.

3. The communication control device according to claim 1, wherein the set information contains a cipher text obtained by encrypting the group key according to authenticated encryption in which the node key is used.

4. The communication control device according to claim 1, wherein the one or more processors generate set information which contains a cipher text obtained by encrypting the group key using the node key assigned to a root node of partial tree included in the set.

5. The communication control device according to claim 4, wherein the set information and the range information are generated by repeatedly performing, either from a leftmost leaf node toward a rightmost leaf node or from the rightmost leaf node toward the leftmost leaf node, a tracing operation that includes an operation of obtaining the set information, which indicates a set of the predetermined number of the partial trees each including only the leaf node identified by the node IDs, and an operation of obtaining the range information of the indices of the leaf nodes included in the obtained set.

6. The communication control device according to claim 4, wherein the set information and the range information are generated by
obtaining one or more of partial trees by repeatedly performing, either from a leftmost leaf node toward a rightmost leaf node or from the rightmost leaf node toward the leftmost leaf node, an operation of obtaining partial tree including only the leaf nodes identified by the node IDs,
dividing the obtained partial trees into the sets each including the predetermined number of partial trees, and
obtaining the range information of the indices assigned to leaf nodes of the partial trees included in each of the sets.

7. The communication control device according to claim 4, wherein, when a leaf node is deleted from the group, the one or more processors regenerate the set information and the range information by referring to the node IDs of leaf nodes belonging to the group from which a leaf node has been deleted.

8. The communication control device according to claim 4, wherein the set information contains key information that enables communication devices, which are associated to leaf nodes of the partial tree included in the set, to derive a group key.

9. The communication control device according to claim 1, wherein the set information contains the node IDs for identifying the node key assigned to the root node.

10. A communication control method comprising:
receiving input of a binary tree in which each leaf node has an index and a node key assigned thereto;
receiving input of node IDs that, from among leaf nodes, enable identification of leaf nodes belonging to a group;
generating a cipher text by encrypting a group key shared in the group using the node key assigned to a root node of partial tree of the binary tree, the partial tree including only the leaf nodes identified by the node IDs;
generating set information containing the generated cipher text, the set information indicating a set of a predetermined number of partial trees of the binary tree, each of the partial trees including only the leaf nodes identified by the node IDs;
generating range information indicating a lower limit value and an upper limit value of indices assigned to a plurality of leaf nodes of the predetermined number of partial trees included in the set; and
outputting the set information and the range information at least to a communication device associated to a leaf node belonging to the group;
wherein, when a leaf node is added to the group, the method comprises regenerating the set information and the range information by referring to the node IDs of leaf nodes belonging to the group to which a leaf node has been added.

11. A computer program product having a non-transitory computer readable medium including programmed instructions, wherein the instructions, when executed by one or more computer processors, cause the one or more computer processors to perform:
receiving input of a binary tree in which each leaf node has an index and a node key assigned thereto, and
receiving input of node IDs that, from among leaf nodes, enable identification of leaf nodes belonging to a group;
generating a cipher text by encrypting a group key shared in the group using the node key assigned to a root node of partial tree of the binary tree, the partial tree including only the leaf nodes identified by the node IDs; and
generating set information containing the generated cipher text, the set information indicating a set of a predetermined number of partial trees of the binary tree, each of the partial trees including only the leaf nodes identified by the node IDs;
generating range information indicating a lower limit value and an upper limit value of indices assigned to a plurality of leaf nodes of the predetermined number of partial trees included in the set; and
outputting the set information and the range information at least to a communication device associated to a leaf node belonging to the group;
wherein, when a leaf node is added to the group, the one or more computer processors regenerate the set information and the range information by referring to the node IDs of leaf nodes belonging to the group to which a leaf node has been added.

12. A communication control device comprising:
one or more processors that
output, at least to a communication device associated to a leaf node belonging to a group, set information and range information that are generated based on a binary tree in which each leaf node has an index and a node key assigned thereto and based on node IDs that, from among leaf nodes, enable identification of leaf nodes belonging to the group, wherein
the set information indicates a set of a predetermined number of partial trees of the binary tree, each of the partial trees including only the leaf nodes identified by the node IDs, and the set information contains a cipher text that is generated by encrypting a group key shared in the group using the node key assigned to a root node of a partial tree included in the set; and
the range information indicates a lower limit value and an upper limit value of indices assigned to a plurality of leaf nodes of the predetermined number of partial trees included in the set,
wherein, when a leaf node is added to the group, the one or more processors regenerate the set information and the range information by referring to the node IDs of leaf nodes belonging to the group to which a leaf node has been added.

13. A communication device comprising:
one or more processors that
receive set information and range information that are generated based on a binary tree in which each leaf node has an index and a node key assigned thereto and based on node IDs that, from among leaf nodes, enable identification of leaf nodes belonging to the group, wherein
the set information indicates a set of a predetermined number of partial trees of the binary tree, each of the partial trees including only the leaf nodes identified by the node IDs, and the set information contains a cipher text that is generated by encrypting a group key shared in the group using the node key assigned to a root node of a partial tree included in the set; and
the range information indicates a lower limit value and an upper limit value of indices assigned to a plurality of leaf nodes of the predetermined number of partial trees included in the set,
wherein the one or more processors determine whether or not the range information contains a device ID of the communication device; and
perform, when it is determined that the range information contains the device ID, processing using the set information, and do not perform, when it is determined that the range information does not contain the device ID, the processing using the set information.

14. The communication device according to claim 13, wherein the set information and the range information are generated by repeatedly performing, either from a leftmost leaf node toward a rightmost leaf node or from the rightmost leaf node toward the leftmost leaf node, a tracing operation that includes an operation of obtaining the set information, which indicates a set of the predetermined number of the partial trees each including only the leaf node identified by the node IDs, and an operation of obtaining the range information of the indices of the leaf nodes included in the obtained set.

15. The communication device according to claim 13, wherein the set information and the range information are generated by
obtaining one or more of partial trees by repeatedly performing, either from a leftmost leaf node toward a rightmost leaf node or from the rightmost leaf node toward the leftmost leaf node, an operation of obtaining partial tree including only the leaf nodes identified by the node IDs, dividing the obtained partial trees into sets each including the predetermined number of partial trees, and obtaining the range information of the indices assigned to leaf nodes of the partial trees included in each of the sets.

16. The communication device according to claim 13, wherein the set information contains key information that enables communication devices, which are associated to leaf nodes of the partial tree included in the set, to derive a group key.

17. A communication method comprising:

receiving set information and range information that are generated based on a binary tree in which each leaf node has an index and a node key assigned thereto and based on node IDs that, from among leaf nodes, enable identification of leaf nodes belonging to a group, wherein the set information indicates a set of a predetermined number of partial trees of the binary tree, each of the partial trees including only the leaf nodes identified by the node IDs, and the set information contains a cipher text that is generated by encrypting a group key shared in the group using the node key assigned to a root node of a partial tree included in the set; and the range information indicates a lower limit value and an upper limit value of indices assigned to a plurality of leaf nodes of the predetermined number of partial trees included in the set, wherein the method further comprises:

determining whether or not the range information contains a device ID of a communication device, and performing, when it is determined that the range information contains the device ID, processing using the set information, and not performing, when it is determined that the range information does not contain the device ID, the processing using the set information.

18. A computer program product having a non-transitory computer readable medium including programmed instructions, wherein the instructions, when executed by one or more processors, cause the one or more processors to perform:

receiving set information and range information that are generated based on a binary tree in which each leaf node has an index and a node key assigned thereto and based on node IDs that, from among leaf nodes, enable identification of leaf nodes belonging to a group, wherein the set information indicates a set of a predetermined number of partial trees of the binary tree, each of the partial trees including only the leaf nodes identified by the node IDs, and the set information contains a cipher text that is generated by encrypting a group key shared in the group using the node key assigned to a root node of a partial tree included in the set; and the range information indicates a lower limit value and an upper limit value of indices assigned to a plurality of leaf nodes of the predetermined number of partial trees included in the set, wherein the one or more processors determine whether or not the range information contains a device ID of a communication device; and perform, when it is determined that the range information contains the device ID, processing using the set information, and do not perform, when it is determined that the range information does not contain the device ID, the processing using the set information.

* * * * *